(12) United States Patent
Jahns et al.

(10) Patent No.: US 11,584,232 B2
(45) Date of Patent: Feb. 21, 2023

(54) FLEXIBLE AND VARIABILITY-ACCOMMODATING INSTRUMENT CLUSTER DISPLAY

(71) Applicant: PACCAR Inc, Bellevue, WA (US)

(72) Inventors: Steven Karl Jahns, Bellingham, WA (US); Ryan Anthony Reed, Kenmore, WA (US); Jonathan Scott Duncan, Seattle, WA (US); Derek Scott Sancer, Denton, TX (US); Jon Forrest Acton, Ft. Worth, TX (US); Jacob Michael White, Flower Mound, TX (US); David Leetz, Denton, TX (US); Steven Robert Rainey, Alvord, TX (US); Mark Andrew Wagner, Bellevue, WA (US); Raeef Hesham Wahib Barsoum, Bellingham, WA (US); Anna-Magdalena Schatz, Bensheim (DE); Tobias Graening, Muehlheim (DE); Christina Nenke, Muehlheim (DE); Marc George Wilczak, Lake Balboa, CA (US); Nicole Johnson, West Los Angeles, CA (US)

(73) Assignee: PACCAR Inc, Bellevue, WA (US)

( * ) Notice: Subject to any disclaimer, the term of this patent is extended or adjusted under 35 U.S.C. 154(b) by 83 days.

(21) Appl. No.: 17/067,306

(22) Filed: Oct. 9, 2020

(65) Prior Publication Data
US 2021/0237572 A1    Aug. 5, 2021

Related U.S. Application Data

(60) Provisional application No. 62/978,698, filed on Feb. 19, 2020, provisional application No. 62/978,691, (Continued)

(51) Int. Cl.
*B60K 35/00* (2006.01)

(52) U.S. Cl.
CPC ........ *B60K 35/00* (2013.01); *B60K 2370/115* (2019.05); *B60K 2370/151* (2019.05)

(58) Field of Classification Search
CPC .............. B60K 35/00; B60K 2370/115; B60K 2370/151
See application file for complete search history.

(56) References Cited

U.S. PATENT DOCUMENTS 5,757,268 A  *  5/1998  Toffolo  .............. G01C 21/3626
                                                        340/459
6,539,289 B2 *  3/2003  Ogino   .................. G01C 21/265
                                                        701/1
(Continued)

FOREIGN PATENT DOCUMENTS

CA         2844176 A1 *  9/2014  ............. B60K 31/00
EP         3715164 A1 *  9/2020
(Continued)

*Primary Examiner* — Chico A Foxx
(74) *Attorney, Agent, or Firm* — Merchant & Gould P.C.

(57) ABSTRACT

Systems, methods and computer readable storage media provide a flexible and variability-accommodating instrument cluster for display on an in-vehicle screen and a user experience interaction model for providing vehicle status-related information via the instrument cluster. The instrument cluster may be shown in a minimized content view, basic content view, or enhanced content view, wherein each content view may include a varying range of displayed information based on a layout template. The driver can easily scroll between the various content views while driving. The instrument cluster may alternatively be shown in a favorites view, amongst a plurality of preconfigured favorites views associated with different drivers, the favorites view including a user-selected set of gauges in a user-selected layout. A steering wheel-based shortcut control is provided that can be assigned to a changeable parameter and
(Continued)

used to toggle the parameter in association with an instrument cluster display element while driving.

19 Claims, 24 Drawing Sheets

Related U.S. Application Data filed on Feb. 19, 2020, provisional application No. 62/970,486, filed on Feb. 5, 2020.

(56) References Cited

U.S. PATENT DOCUMENTS

| | | | | |
|---|---|---|---|---|
| 6,667,726 | B1 * | 12/2003 | Damiani | B60K 37/02 |
| | | | | 701/1 |
| 6,812,942 | B2 * | 11/2004 | Ribak | B60W 50/14 |
| | | | | 715/705 |
| 7,683,771 | B1 * | 3/2010 | Loeb | B63B 49/00 |
| | | | | 701/1 |
| 8,483,907 | B2 * | 7/2013 | Tarte | B60K 35/00 |
| | | | | 715/764 |
| 8,577,487 | B2 * | 11/2013 | Tarte | G06Q 30/06 |
| | | | | 705/26.5 |
| 9,140,568 | B2 * | 9/2015 | Waite | G01C 21/3688 |
| 9,254,750 | B2 * | 2/2016 | Tarte | B60K 37/06 |
| 9,457,665 | B1 * | 10/2016 | Boss | H04N 5/225 |
| 9,616,751 | B2 * | 4/2017 | Ding | B60K 37/02 |
| 9,886,283 | B2 * | 2/2018 | Cepuran | B60K 35/00 |
| 10,140,956 | B2 * | 11/2018 | Ueda | G09G 5/14 |
| 2002/0085043 | A1 * | 7/2002 | Ribak | B60W 50/14 |
| | | | | 715/810 |
| 2004/0117084 | A1 * | 6/2004 | Mercier | B60R 11/02 |
| | | | | 307/10.1 |
| 2004/0172182 | A1 * | 9/2004 | Pathare | B60K 35/00 |
| | | | | 340/425.5 |
| 2008/0211652 | A1 * | 9/2008 | Cope | B60K 35/00 |
| | | | | 340/461 |
| 2011/0074689 | A1 * | 3/2011 | Sentchenkoff | B62K 11/14 |
| | | | | 345/168 |
| 2011/0175754 | A1 * | 7/2011 | Karpinsky | B60K 35/00 |
| | | | | 340/963 |
| 2013/0245882 | A1 * | 9/2013 | Ricci | G06F 3/0486 |
| | | | | 701/36 |
| 2013/0293364 | A1 * | 11/2013 | Ricci | G02B 27/0101 |
| | | | | 340/425.5 |
| 2014/0109080 | A1 * | 4/2014 | Ricci | G06F 8/61 |
| | | | | 717/174 |
| 2014/0152433 | A1 * | 6/2014 | Sugiyama | G01C 21/3626 |
| | | | | 340/438 |
| 2015/0310287 | A1 * | 10/2015 | Tseng | G06F 3/013 |
| | | | | 382/104 |
| 2017/0072796 | A1 * | 3/2017 | Ding | G06F 3/04847 |
| 2017/0255681 | A1 * | 9/2017 | Giunio-Zorkin | G06F 16/9574 |
| 2017/0334500 | A1 * | 11/2017 | Jarek | H04B 7/26 |
| 2018/0367478 | A1 * | 12/2018 | Desjardins | H04L 51/216 |
| 2019/0011042 | A1 * | 1/2019 | Fribus | G06F 3/04886 |
| 2021/0173532 | A1 * | 6/2021 | Van der Keere | G06F 3/0488 |
| 2021/0237573 | A1 | 8/2021 | Jahns | |
| 2021/0237574 | A1 | 8/2021 | Jahns | |
| 2021/0237576 | A1 | 8/2021 | Jahns | |
| 2021/0239204 | A1 | 8/2021 | Jahns | |

FOREIGN PATENT DOCUMENTS

| | | | | |
|---|---|---|---|---|
| KR | 838183 B1 * | 6/2008 | | B60K 35/00 |
| KR | 100838183 B1 * | 6/2008 | | B60K 35/00 |
| WO | WO-2008108844 A1 * | 9/2008 | | B60K 35/00 |
| WO | WO-2019117787 A1 * | 6/2019 | | |

* cited by examiner

| | RIGHT | 606a | 606b | 606c | 606d | 606e | 606f | 606g |
|---|---|---|---|---|---|---|---|---|
| TOP | CONTAINER 5 (604e) | CONTAINER 8 (604h) | 1 | | | | 1 | 1 | 1 |
| MIDDLE | CONTAINER 6 (604f) | CONTAINER 9 (604i) | | 1 | | 1 | | 1 | 1 |
| BOTTOM | CONTAINER 7 (604g) | CONTAINER 10 (604j) | | | 1 | 1 | 1 | 1 | 1 |

FIG. 6C

| | RIGHT | 606h | 606i | 606j | 606k | 606l | 606m | 606n | 606o | 606p |
|---|---|---|---|---|---|---|---|---|---|---|
| TOP | CONTAINER 5 (604e) | CONTAINER 8 (604h) | 2 | | 2 | | 2 | 2 | 1 | 1 | 2 |
| MIDDLE | CONTAINER 6 (604f) | CONTAINER 9 (604i) | | 2 | 1 | 2 | 1 | 1 | 2 | 2 | 2 |
| BOTTOM | CONTAINER 7 (604g) | CONTAINER 10 (604j) | | | | 1 | 1 | 1 | 1 | 1 | x |

FIG. 6D

| | RIGHT | 606q | 606r | 606s | 606t | 606u | 606v |
|---|---|---|---|---|---|---|---|
| TOP | CONTAINER 5 (604e) | CONTAINER 8 (604h) | 3 | | 1 | 3 | 3 | x |
| MIDDLE | CONTAINER 6 (604f) | CONTAINER 9 (604i) | | 3 | 3 | 1 | x | 3 |
| BOTTOM | CONTAINER 7 (604g) | CONTAINER 10 (604j) | | | x | x | 1 | 1 |

FIG. 6E

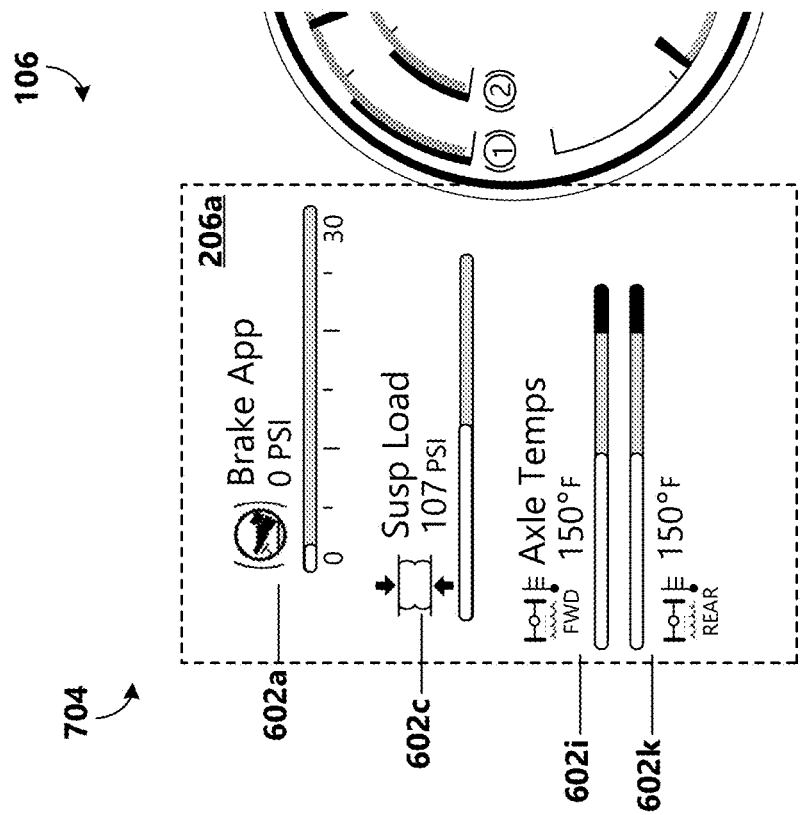
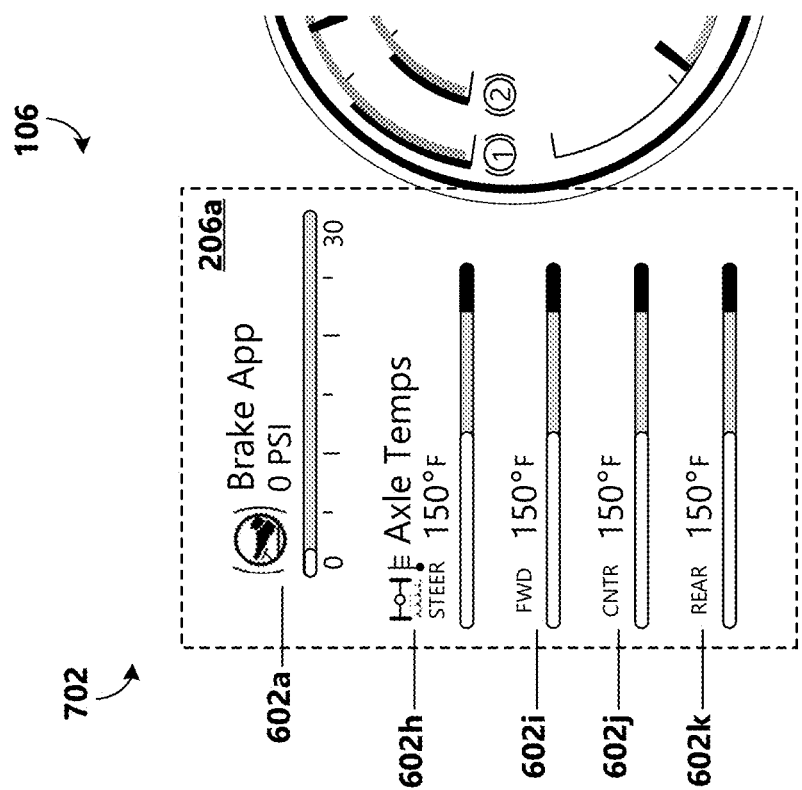
FIG. 7B
FIG. 7A

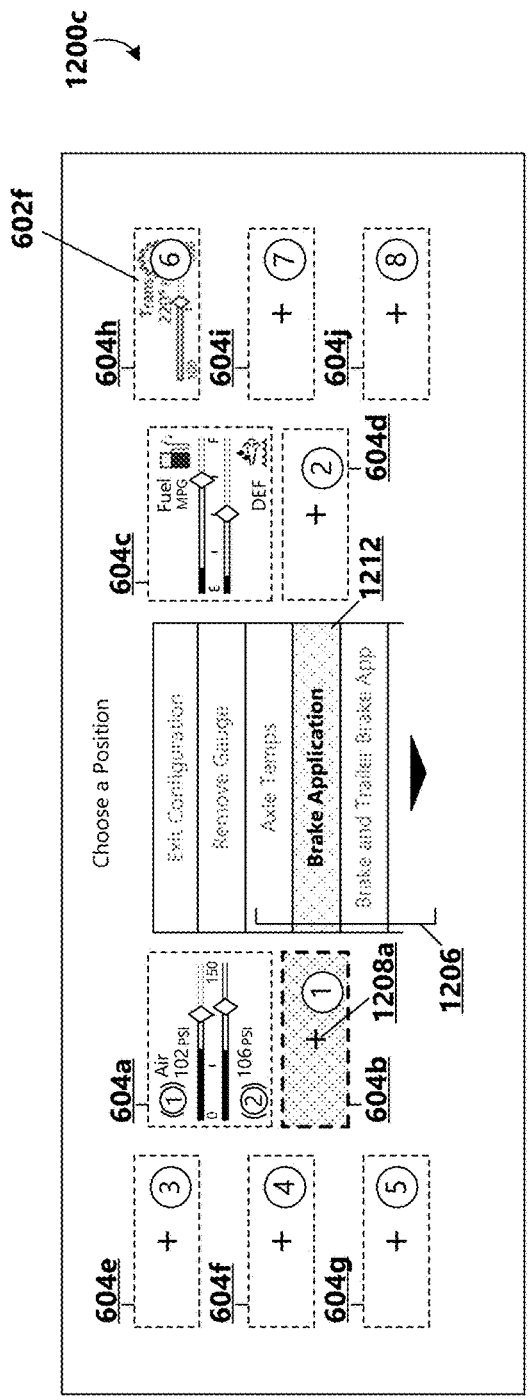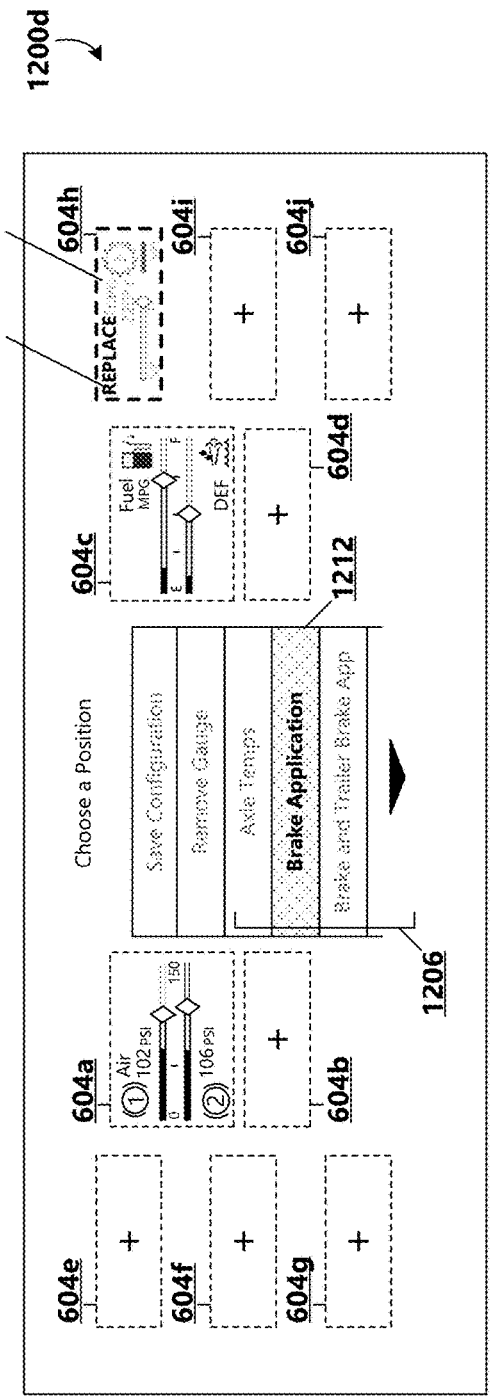
FIG. 12C
FIG. 12D

FLEXIBLE AND VARIABILITY-ACCOMMODATING INSTRUMENT CLUSTER DISPLAY

CROSS-REFERENCE TO RELATED APPLICATIONS

This application claims the benefit of U.S. Provisional Application No. 62/970,486, having the title of "HIGHLY FLEXIBLE AND VARIATION ACCOMMODATING GAUGE PRESENTATION SYSTEM" and the filing date of Feb. 5, 2020, U.S. Provisional Application No. 62/978,691, having the title of "INSTRUMENT CLUSTER USER INTERFACE" and the filing date of Feb. 19, 2020, and U.S. Provisional Application No. 62/978,698, having the title of "INSTRUMENT CLUSTER USER INTERFACE" and the filing date of Feb. 19, 2020, which are incorporated herein by reference in their entireties.

BACKGROUND

Instrument clusters for vehicles typically have been mechanical analog gauges having a dial and a rotating needle that points to indicia printed on the dial to provide a driver with a visual indication of a measurement associated with a current status of the vehicle. For example, typically, the vehicle may be configured with physical gauges to inform the driver of information useful for operation of the vehicle. As can be appreciated, such a configuration of physical gauges may occupy valuable real estate space in the vehicle and can be distracting to the driver. For example, a number of gauges may show information that are in a 'normal' or non-needed state. The display of such information may not provide a benefit to the driver, and may instead overload the driver with available information. As such, the driver may be less aware and/or responsive to abnormal conditions that may necessitate the driver's attention. Additionally, physical gauges and the arrangement of gauges may vary amongst various vehicle build configurations. For example, custom-built vehicles may have various instrumentation configurations corresponding to variations in vehicle build configurations, wherein a vehicle may be ordered with a variety of gauges and vary across fleet orders or applications in which the vehicle may be used. In some examples, this may also unfavorably require a manufacturer of the vehicle to dedicate resources (e.g., inventory, storage for inventory, assembly resources associated with more complex assembly) to building vehicles with high part variation.

Currently, some vehicles comprise digital interfaces that include gauge content; however, such digital interfaces may not be able to be customized to a vehicle while accommodating variability in build configurations and instrument gauges. Additionally, being able to customize an instrument cluster to modify displayed gauge content may require the driver to navigate through a series of menu selections to view specific gauges, and then toggle between a limited set one or a few at a time. For example, this may not be easily performed while driving. Further, transitions between displayed content may not be smooth. For example, current systems may simply replace one digital gauge for another, may not expand from a minimal view to a maximum number, and may lose gauges during changing view modes.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing a flexible and variability-accommodating instrument cluster and user experience interaction model for displaying the instrument cluster on an in-vehicle screen. According to one aspect, the instrument cluster and user interaction model are implemented in a heavy truck. The interaction model may be based on a smooth transition of content (e.g., gauge content) from a minimal amount of shown content to a maximized number of content (e.g., gauges) shown on the screen. By expanding or contracting (e.g., adding and removing) gauge content, the instrument cluster interface can be matched to a driver's preference for how much information the driver may want to view. Additionally, the instrument cluster and user interaction model may help to minimize distractions caused by un-necessarily showing information that is in a 'normal' or non-needed state. In some examples, a favorites function may be provided that allows for a user to select a set of gauges to include in a personalized favorites view. In some examples, a plurality of personalized favorites views and other settings may be stored in association with a plurality of drivers.

The transition of content included in the instrument cluster may be performed in response to a user input via an input mechanism, such as a push-enabled thumb wheel scroll mounted on a steering wheel. Interaction with the thumb wheel scroll in a first direction may expand the displayed content from a minimal view to a maximum number of gauges, and interaction with the thumb wheel scroll in an opposite direction may contract the displayed content from a maximum number of gauges to a minimal view. The simplified thumb wheel scroll interaction may allow for the adjustment of content detail while driving. In some examples, an additional input mechanism may be provided for enabling the driver to toggle a changeable instrument cluster display parameter that may typically be inaccessible or difficult to access while driving. For example, the additional input mechanism may be a steering wheel-based shortcut button that can be programed to toggle between a user-selected parameter, such that the driver is provided a simplified way to personalize or optimize the instrument cluster display while driving.

In one aspect, a method for providing a flexible and variability-accommodating instrument cluster for display on a screen in a vehicle is provided. In an example embodiment, the method comprises: displaying the instrument cluster in a first content view of a set of content views, wherein the set of content views range from including a minimized set of content to a maximized set of content; receiving an indication of a user-selection to change the displayed first content view to a next content view; and in response, displaying the instrument cluster in the next content view, wherein displaying the instrument cluster in the next content view comprises expanding or contracting the set of content included in the displayed instrument cluster based on the selected next content view.

In another aspect, a system is provided that is configured to provide a flexible and variability-accommodating instrument cluster for display on a screen in a vehicle. In an example embodiment, the system comprises at least one processor; a memory storage device including instructions that when executed by the at least one processor are configured to: display the instrument cluster in a first content view of a set of content views, wherein the set of content views range from including a minimized set of content to a maximized set of content; receive an indication of a user-selection to change the displayed first content view to a next content view; and in response, display the instrument cluster in the next content view, wherein, in the next content view, the set of content included in the displayed instrument cluster is expanded or contracted based on the selected next content view.

In another aspect, a computer-readable storage device is provided, wherein the computer-readable storage device includes computer readable instructions, which when executed by a processing unit, are configured to perform an embodiment of the method. In an example embodiment, the instructions are configured to provide: displaying a flexible and variability-accommodating instrument cluster on a screen in a vehicle in a first content view of a set of content views, wherein the set of content views range from including a minimized set of content to a maximized set of content arranged according to a default layout of content containers associated with a set of layout rules, and further include a favorites view comprising a pre-selected set of content in a pre-selected layout specific to a driver of the vehicle or specific to a task associated with usage of the vehicle; receiving an indication of a user-selection to change the displayed first content view to a next content view; and in response, displaying the instrument cluster in the next content view, wherein displaying the instrument cluster in the next content view comprises: when the next view is the content view including the maximized set of content, determining which content, from a set of available content, to include in the maximized set of content based on a priority level and the set of layout rules; expanding or contracting the set of content included in the displayed instrument cluster based on the selected next content view; or if the favorites view is selected, displaying the pre-selected set of content in the pre-selected layout.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIGS. 6C, 6D and 6E illustrate various example gauge format combinations;

FIGS. 7A and 7B illustrate variations in instrument cluster gauges based on variations in vehicle build configurations;

FIGS. 12A-E are illustrations of example favorites view setup user interfaces;

DETAILED DESCRIPTION

Figure 1A:
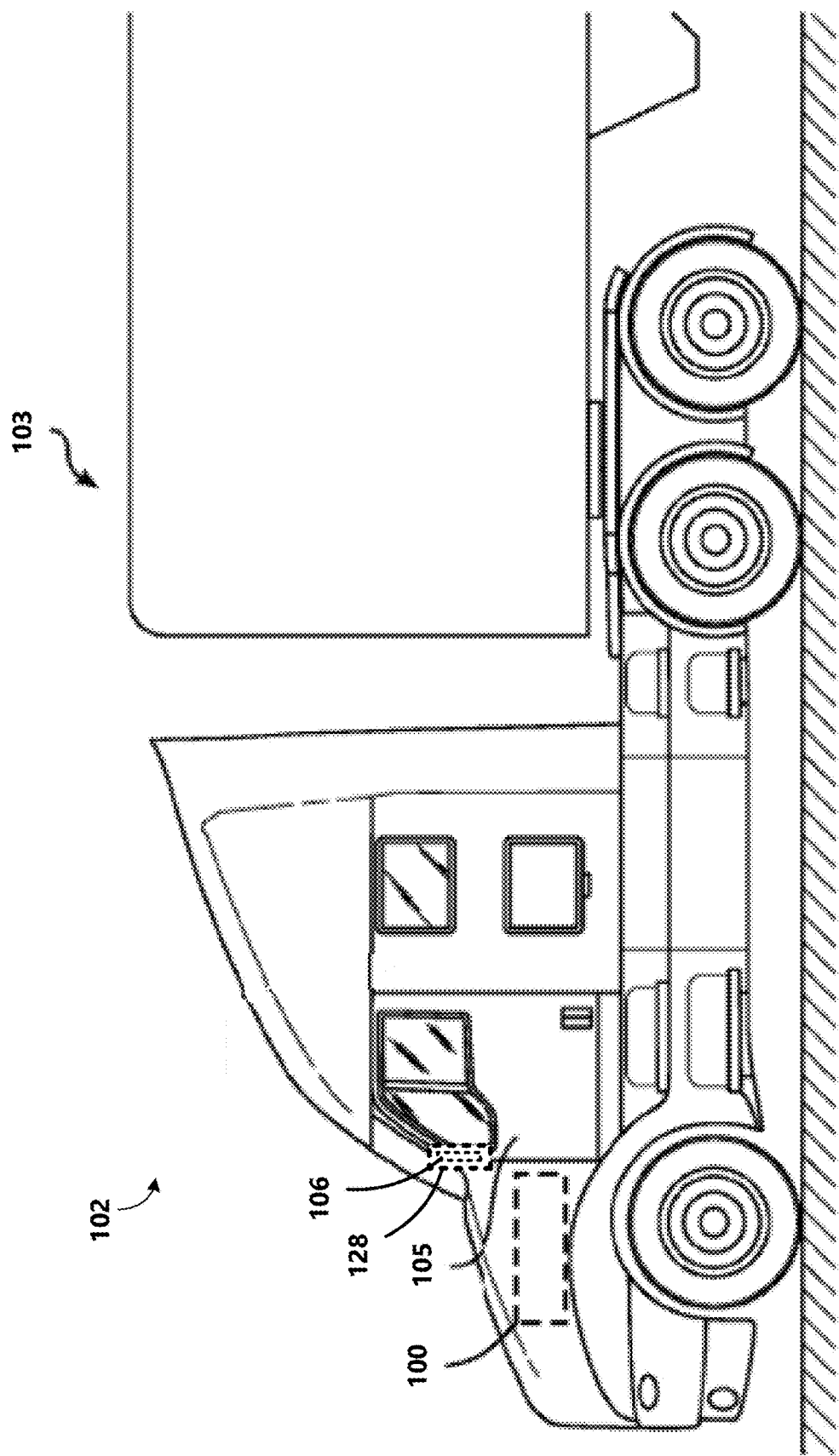
FIG. 1A is an illustration depicting a side view of a vehicle.

Aspects of the present disclosure are generally directed to systems, methods and computer readable storage media for providing a flexible and variability-accommodating instrument cluster for display on an in-vehicle screen and a user experience interaction model for providing vehicle status-related information via the instrument cluster. The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

FIG. 1A depicts a side view of a vehicle 102. The vehicle 102 may be a part of a tractor-trailer combination, which may include the vehicle 102 having a so-called fifth wheel by which a box-like, flat-bed, or tanker semi-trailer 103 (among other examples) may be attached for transporting cargo or the like. While the vehicle 102 is depicted as a truck in FIG. 1A, it should be appreciated that the present technology is applicable to any type of vehicle where a flexible and variability-accommodating instrument cluster display is desired.

The example vehicle 102 includes a cabin 105 from which a driver may operate the vehicle 102. The cabin 105 includes a display screen 128 on which a flexible and variability-accommodating instrument cluster 106 may be displayed. According to one aspect, the instrument cluster 106 is configured to provide vehicle status-related information to the driver of the vehicle 102. Gauges included in the displayed instrument cluster 106 and display attributes of the notifications may be determined by an instrument cluster display system 100 of the vehicle 102. Components and operations of an example instrument cluster display system 100 are discussed in further detail below.

Figure 1B:
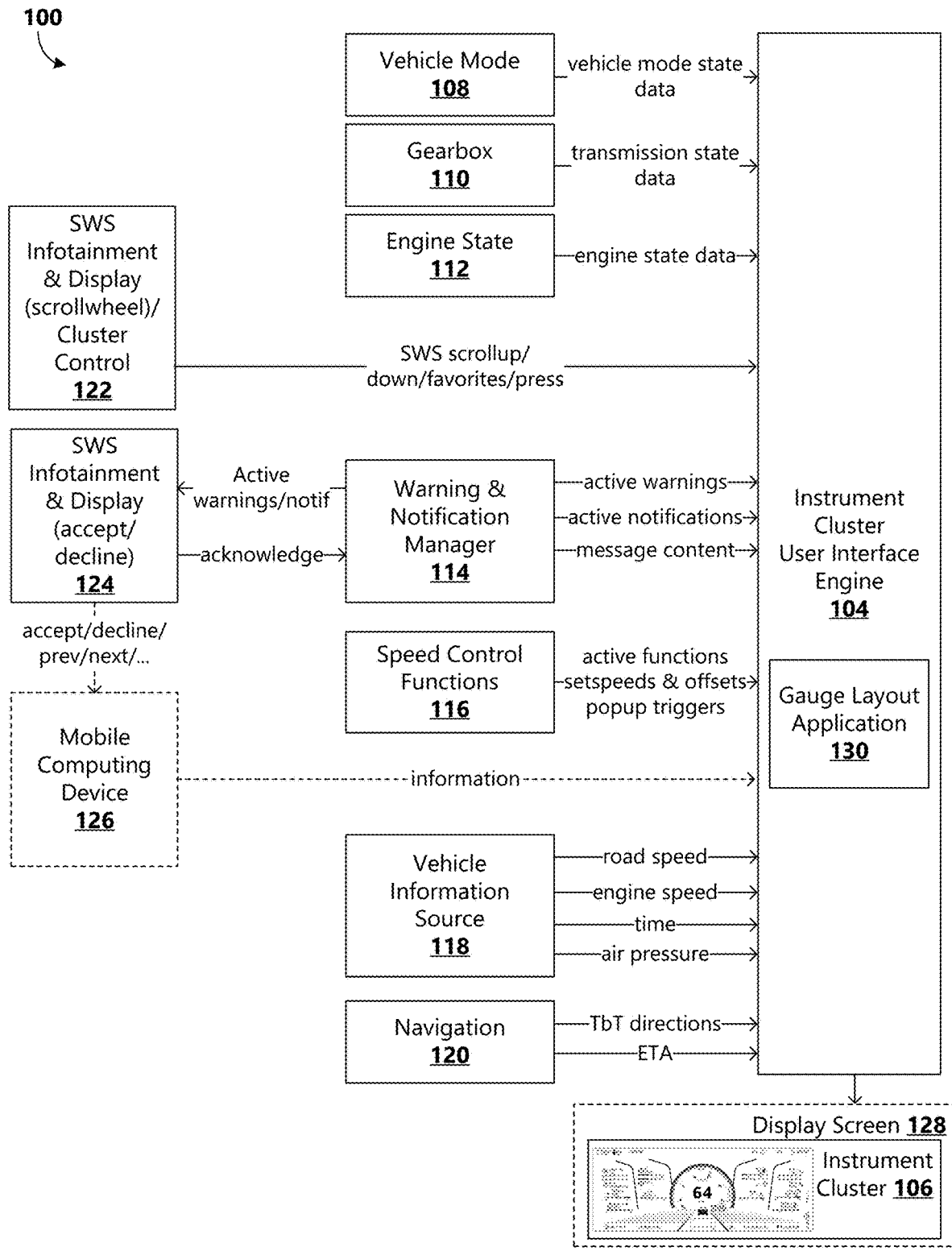
FIG. 1B is a block diagram of an example environment in which a system of the present disclosure can be implemented in a vehicle according to an embodiment.

With reference to FIG. 1B, a schematic block diagram is provided of an example instrument cluster display system 100 in which aspects of the present disclosure can be implemented. For example, some or all of the elements included in the instrument cluster display system 100 may be embodied in the vehicle 102. The example instrument cluster display system 100 includes a vehicle 102 on which various data sources are in communication with an instrument cluster user interface (UI) engine 104. According to an aspect, the instrument cluster UI engine 104 is illustrative of a software module, system, or device that is operative or configured to receive various signal inputs from a plurality of data sources and provide at least a portion of the flexible and variability-accommodating instrument cluster 106 for display on the display screen 128 included in the vehicle 102. For example, the instrument cluster 106 may be utilized for providing a selectable amount of information to a driver of the vehicle 102, wherein the driver may be provided with an ability to control the visual workload. In some examples, the instrument cluster UI engine 104 may include or be communicatively connected to a gauge layout application 130 comprising logic rules and layout rules that may be used by the instrument cluster UI engine 104 to select inclusion and placement of gauges in the maximized content view.

The plurality of data sources may include any suitable data source, unit, or sensor operative to provide various data or signaling information that may be used by the instrument cluster UI engine 104 to provide vehicle status-related information via the instrument cluster 106. The plurality of data sources can include, but are not limited to, a vehicle mode data source 108, a gearbox data source 110, an engine state data source 112, a warning and notification manager 114, a speed control function data source 116, a vehicle information data source 118, a navigation data source 120, and steering wheel switch (SWS) infotainment and display actuation data sources 122, 124 (e.g., via a scrollwheel actuator (also referred to herein as a cluster control 122) or an accept/decline actuator (124)). In some examples, another data source may include a mobile computing device 126 in communication with the instrument cluster UI engine 104. As can be appreciated, in other examples, additional or alternative data sources are possible and are within the scope of the present disclosure.

In an example aspect: the vehicle mode data source 108 is operative to provide vehicle mode state data; the gearbox data source 110 is operative to provide transmission state data; the engine state data source 112 is operative to provide engine state data; the warning and notification manager 114 is operative to provide information associated with active warnings, active notifications, and message content; the speed control function data source 116 is operative to provide information associated with active functions, set-speed values, offset values, and popup triggers; the vehicle information data source 118 is operative to provide information associated with the vehicle's road speed, engine speed, and air pressure, and time; the navigation data source 120 is operative to provide turn-by-turn direction information and estimated arrival time (ETA) information in association with a navigable route; the cluster control 122 is operative to enable the driver to easily transition between content views via a user input associated with the scroll-wheel (e.g., a scroll-up, scroll-down, or press actuation). In some examples, the display screen 128 may include a touch interface via which the driver may be enabled to interact with the instrument cluster 106.

According to an aspect, the instrument cluster UI engine 104 is operative or configured to provide vehicle status-related information that may be presented by the instrument cluster 106 in a driver-selectable content view ranging from a minimal content view to a maximized content view. In some examples, the instrument cluster 106 may be shown in a minimized content view, a basic content view, or an enhanced content view, wherein each content view may include a varying range of displayed information. According to an aspect, when scrolling between content views, the placement of gauges may be retained consistently according to particular zones, thus provided a seamless expansion and contraction of information that is non-jarring/distracting to the driver.

Figure 2A:
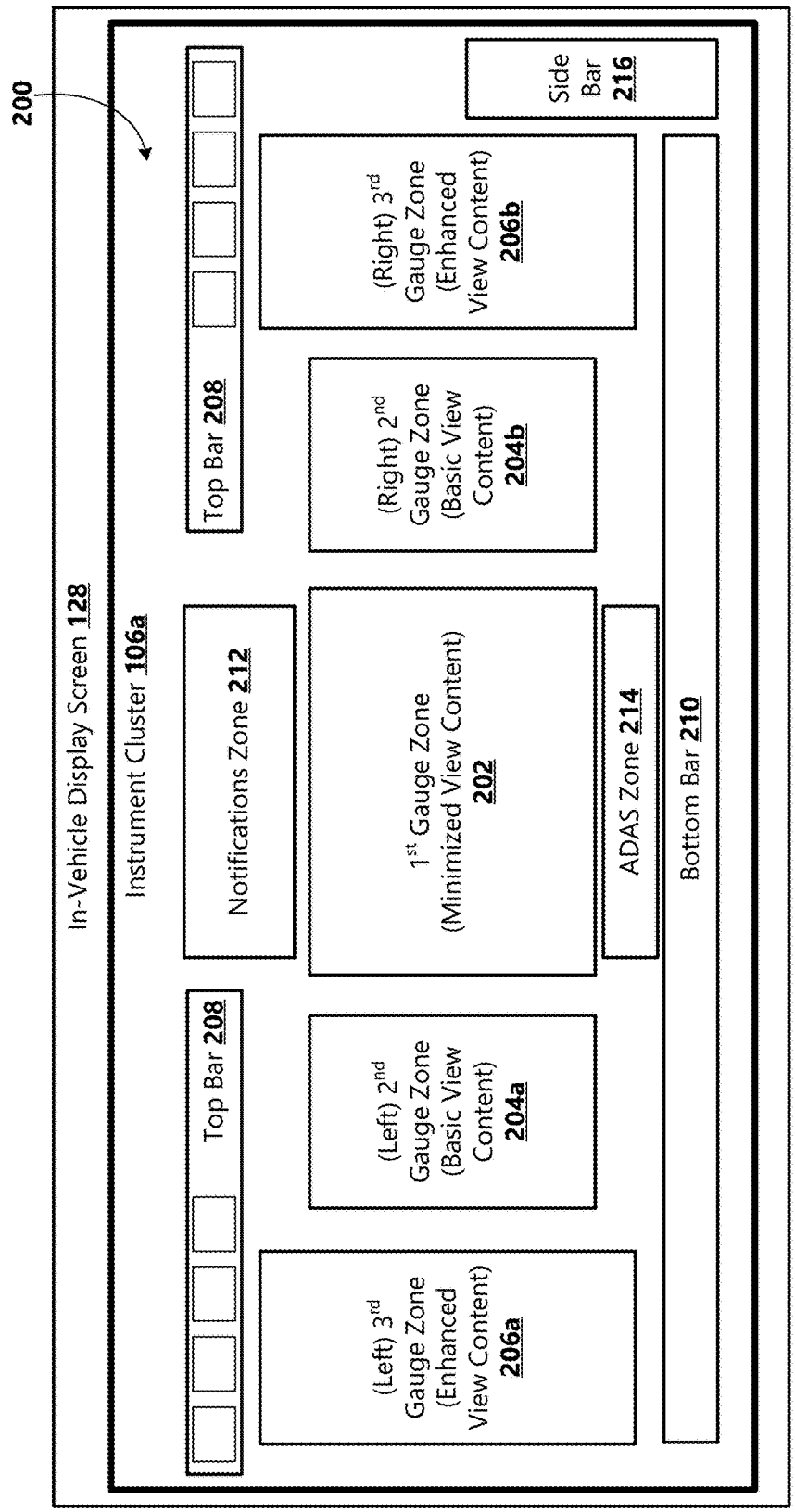
FIG. 2A is an illustration of an example schematic representation of an instrument panel according to an embodiment.
Figure 2A:
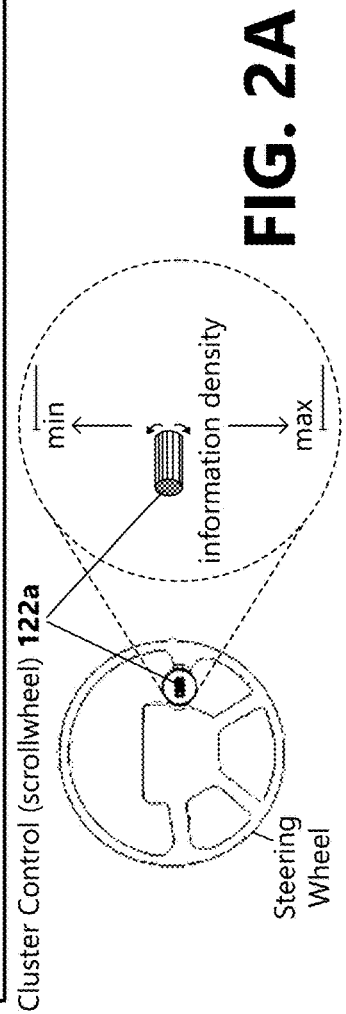

With reference now to FIG. 2A, an example default layout 200a of an instrument cluster 106a displayed on an in-vehicle display screen 128 is shown. For example, the default layout 200a of the instrument cluster 106a may comprise a plurality of content display zones 202-216 that may be displayed or hidden based on a user-selected content view. For example and as will be described in further detail with reference to FIG. 3A, the driver may be enabled to change the number of gauges displayed in the instrument cluster 106 by actuation of a simple thumb wheel scroll included in the cluster control 122a. According to an example aspect, the default layout 200a of the instrument cluster 106a may include a first gauge zone 202 that may be shown in the minimized content view, in the basic content view, and in the enhanced content view, second gauge zones 204a,b (generally 204) that may be hidden in the minimized content view but shown in the basic content view and in the enhanced content view, and a third gauge zone 206a,b (generally 206) that may be hidden in the minimized content view and in the basic content view but shown in the enhanced content view. Examples of vehicle status-related information that may be included in the various gauge zones 202-206 are described below with reference to various example illustrations.

Other elements that may be included in the default layout 200a of the instrument cluster 106a and that may be persistently displayed when the vehicle 102 is in drive mode may include a top bar 208, a bottom bar 210, and a side bar 216. In some examples, the top bar 208 may include a display of one or more of the following information elements: a voltmeter, a clock, an active warning indicator (e.g., indicating a number of active critical red warnings and amber warnings), an outside temperature indicator, and a diesel particulate filter (DPF) status indicator. In some examples, the bottom bar 210 may include a display of one or more of the following information elements: an odometer, a trip odometer, a sub-trip odometer, and engine power take-off (PTO) hours indicator (e.g., if the vehicle 102 is equipped with a PTO system). In some examples, the side bar 216 may include a display of a pagination indication of the drive view (e.g., an indication of an active content view page in relation to a set of content view pages) and a drive mode indication (e.g., an indication of a control position of the active gear: drive, neutral, reverse). As should be appreciated, additional and/or alternative information elements may be displayed in the instrument cluster 106a and are within the scope of the present disclosure.

In some examples, the content display zones included in the default layout 200a of the instrument cluster 106a may further include a notifications zone 212 and an advanced driver-assistance system (ADAS) zone 214. For example, the notifications zone 212 may include suppressible and non-suppressible popup notifications when a fault or a need to message the driver is triggered, and may further include a selectable display of information associated with information sources such as: entertainment/radio, a communicatively-connected mobile computing device 126 (e.g., mobile phone, music device), and navigation system 120. The ADAS zone 214 may be provided when the vehicle 102 is configured with an ADAS and the ADAS is active, and may include a display of passive and/or active driver assistance information, settings, and warnings. In some examples, the notifications zone 212 and the ADAS zone 214 are persistently displayed in each content view mode.

Figure 2B:
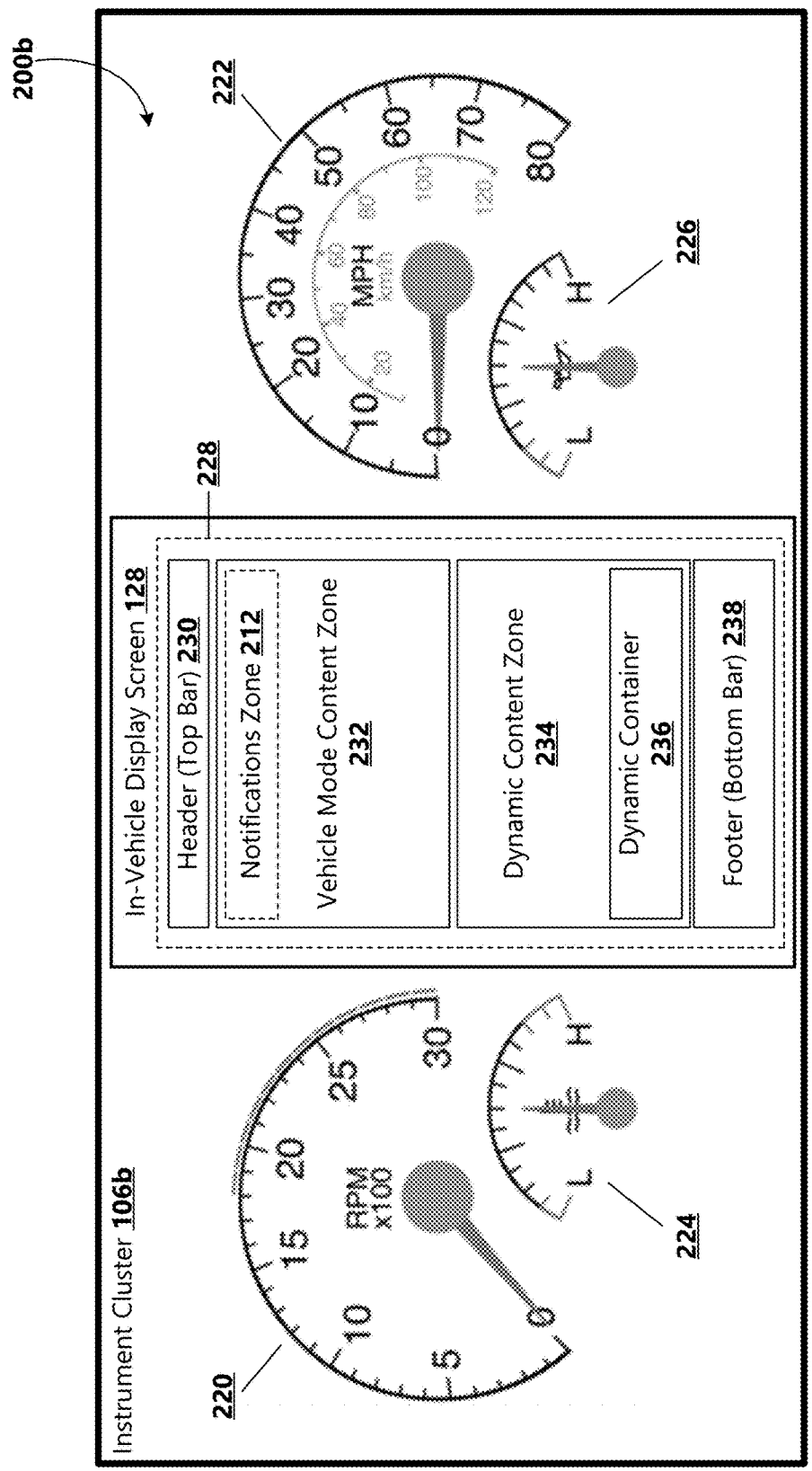
FIG. 2B is an illustration of an example schematic representation of an instrument panel according to another embodiment.
Figure 2B:
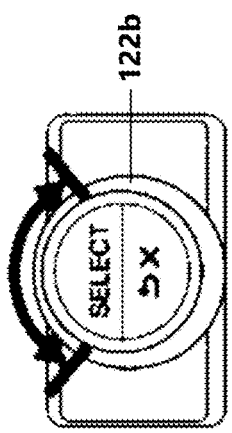

With reference now to FIG. 2B, another example layout 200b of an instrument cluster 106b according to a second embodiment is shown. In some examples, the layout 200b of the instrument cluster 106b may comprise a combination of physical gauges and a digital display. According to one example, the physical gauges may include a tachometer 220, a speedometer 222, an engine coolant temperature gauge 224, and an oil pressure gauge 226, and the digital display may include a display of a plurality of display screens, referred to herein as cards 228, on an in-vehicle display screen 128. In other examples, one or more of the tachometer 220, speedometer 222, engine coolant temperature gauge 224, and oil pressure gauge 226 may be embodied as digital displays.

The cards 228 may include various display zones. In one example, a card 228 may include a header or top bar 230, a vehicle mode content zone 232, a dynamic content zone 234, and a footer or bottom bar 238. For example, the top bar 230 may include a set of persistent content horizontally across the top of the screen 128. The vehicle mode content zone 232 may include content specific to the vehicle's current mode (e.g., drive versus park) and state (e.g., active versus inactive). In some examples, the vehicle mode content zone 232 may include a digital speedometer, cruise control functions, engine brake information, an ADAS zone, and a plurality of digital telltale slots. In some examples, when a determination is made to provide a popup notification (described in further detail below), the popup notification may be displayed in a notifications zone 212 located in a top portion of the vehicle mode content zone 232. For example, the notifications zone 212 may be in a location central to the driver's field of vision on the instrument cluster 106b. The dynamic content zone 234 may include specific content unique to the card 228, which may include gauges, custom setup options, ADAS features, tire pressure monitoring system (TPMS) information, menu options, and/or trip information. The bottom bar 238 may include vehicle-specific fuel gauge configurations.

Figure 3A:
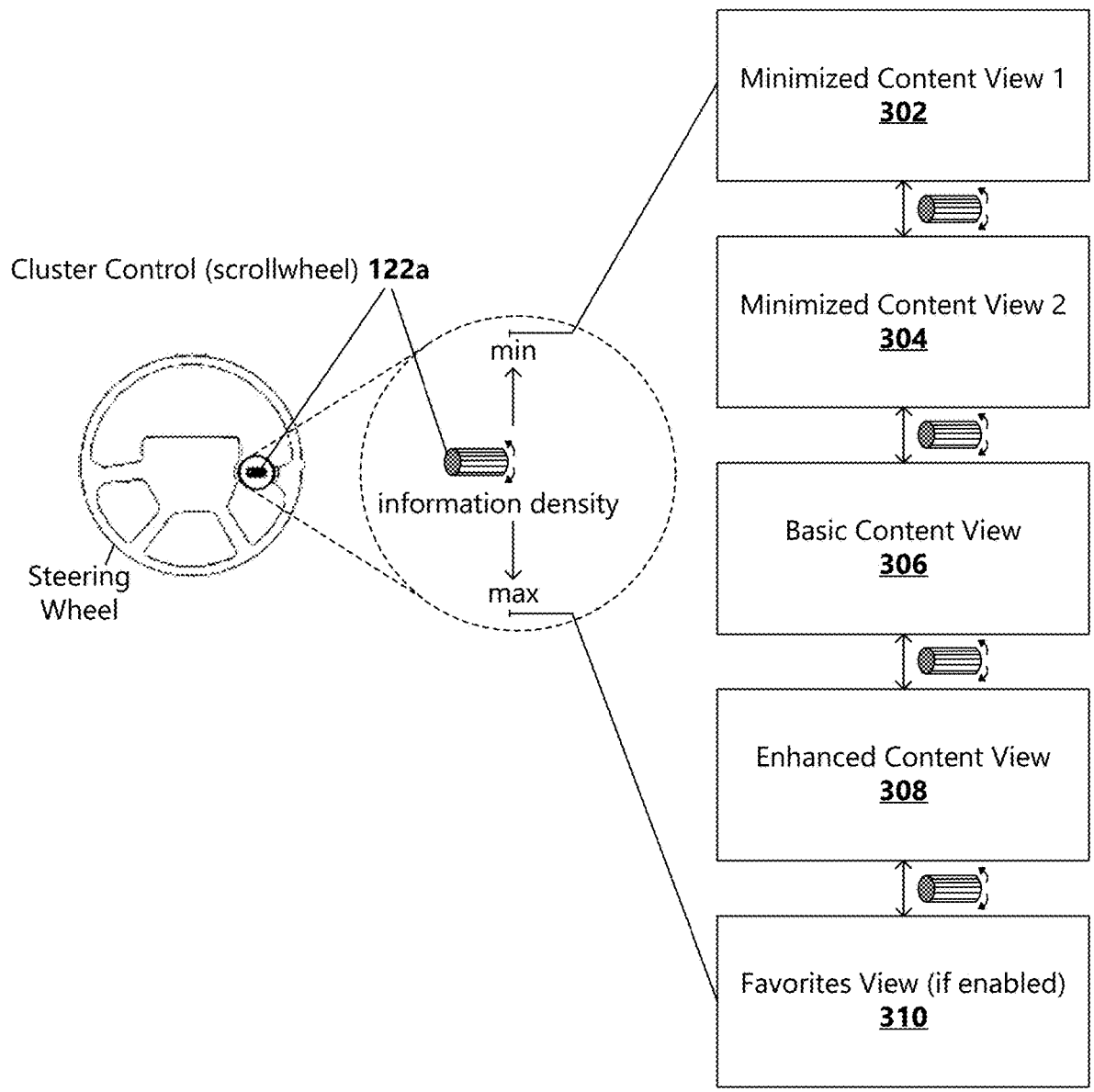
FIG. 3A is an illustration of an scroll pattern between content views using a first embodiment of a cluster control.

In some examples, the instrument cluster UI engine 104 may be operative or configured to determine a card 228 to display, a card state, and information to include in a displayed card 228. Some cards 228 may be standard across vehicles, while other cards may be configuration-driven. Additionally, some cards 228 may be inserted when triggered by an event. For example, if a card 228 is configuration-dependent, the card may be displayed when the vehicle 102 has the corresponding option. Another embodiment of the cluster control 122b is illustrated in FIG. 2B, which may be used to enable the driver to easily transition between cards 228 via a user input associated with the cluster control 122b (e.g., a rotation or press actuation). According to an aspect, the gauge layout application 130 may comprise logic rules and layout rules that may be used by the instrument cluster UI engine 104 to select inclusion and placement of available gauges in the dynamic content zone 234. In some examples, different formats may be used to conserve display area by either combining gauge functions or compressing the gauge information to make room for additional gauges to be displayed. For example, a gauge displayed in the dynamic content zone 234 may be in a single gauge format (e.g., one gauge function displayed individually), a double gauge format (e.g., two gauge functions displayed together), or a compact gauge format (gauges that have elements removed). As mentioned above, the vehicle driver may be enabled to easily scroll between the various content views for selecting the content view with the amount of displayed information that suits the driver. With reference now to FIG. 3A, an example scroll pattern of content views using a first embodiment of the cluster control 122a is shown. According to an example, the cluster control 122a may be embodied as a thumb wheel scroll located on a steering wheel, and an ability to change the number of gauges displayed in the instrument cluster 106a may be provided by a simple thumb wheel scroll via the cluster control 122a. Rather than replacing one digital gauge for another, scrolling to another display view may expand the display of gauges from a minimal view to a maximum number of gauges. In some examples, the display of gauges may range from a first minimized content view 302, to a second minimized content view 304, to a basic content view 306 to an enhanced content view 308. In some examples, a favorites view 310 may be enabled on the vehicle 102, and the favorites view 310 may be placed at the top of the scrollable set of gauge content views. In some examples, an interface feature may be provided which may protect the favorites view 310 from being a part of the main seamless scroll between the minimized-to-maximized content views (i.e., the first minimized content view 302, the second minimized content view 304, the basic content view 306, and the enhanced content view 308). In one example, the interface feature may be a requirement of a particular cluster control 122 actuation, such as an additional nudge. Examples of various gauge content views are described below with reference to FIGS. 4A-6.

Figure 3B:
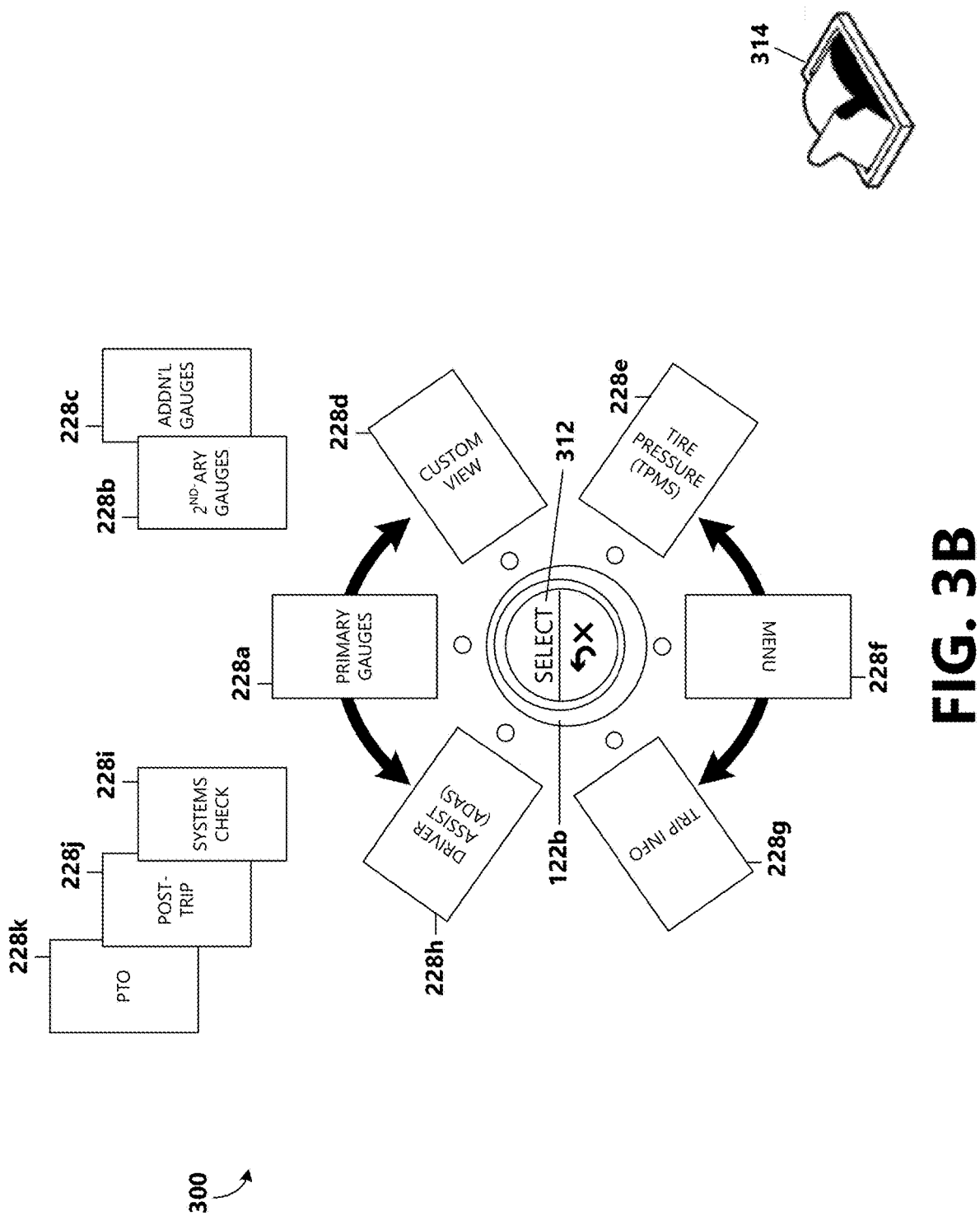
FIG. 3B is an illustration of an scroll pattern between content view cards using a second embodiment of the cluster control.

With reference now to FIG. 3B, an example scroll pattern of content views embodied as cards 228 using another embodiment of the cluster control 122b is shown. According to an example, the cluster control 122b may be embodied as a rotary knob that can be rotated in either direction to navigate between cards 228a-k (generally 228) included in a pagination 300 (e.g., sequenced lineup of cards 228). In some examples, when the vehicle 102 is in drive mode, the user may be enabled to use the cluster control 122b to navigate through the available cards 228. As illustrated, available cards 228 may be configured in a loop, such that rotation of the cluster control 122b may allow for a continuous scrolling through the available cards 228.

In some examples, at least a standard cards set may be configured on a vehicle 102. Example standard cards may include a primary gauges card 228a, a secondary gauges card 228b, an additional gauges card 228c (e.g., the secondary and additional gauges cards 228b,228c may be provided based on the number of gauges configured on the vehicle 102 and when the gauges may be relevant), a custom view card 228d, a menu card 228f, and a trip summary card 228g. In some examples, a set of conditional cards may be provided depending on installed features and capabilities of the vehicle 102. Example conditional cards may include a tire pressure information (TPMS) card 228e, a driver assistance information (ADAS) card 228h, and a PTO card 228k.

In some examples, a set of trigger cards may be provided, which may become available responsive to a particular action, such as an actuation of a toggle or switch or an ignition key state. Example trigger cards may include a post trip card 228j, a systems check card 228i, and the PTO card 228k. In some examples, the post trip card 228j may be displayed for a preconfigured time duration on the display screen 128 when the vehicle 102 is put into park mode and the key is turned to an off position. In some examples, a trigger card 228i-k may be inserted anywhere in the pagination 300 depending on what card 228 is currently displayed on the display screen 128. When a PTO toggle 314 or systems check toggle 314 is switched to an on position, the associated card 228 may be inserted before/above the current visible card position such that the PTO card 288k or systems check card 228i may then be in a visible current position and displayed on the display screen 128. The driver may be enabled to dial the cluster control 122b clockwise and/or counterclockwise to rotate through cards 228 and navigate away from the now active PTO card 228k or systems check card 228i. Responsive to dialing the cluster control 122b down (clockwise), the card that was visible at the time the toggle 314 was switched to the on position may again be displayed. The PTO card 228k or systems check card 228i may remain in the stack of cards 228 until the PTO toggle 314 or systems check toggle 314 is turned to an off position, wherein the PTO card 228k or systems check card 228i may be extracted/removed from the pagination. In some examples, if the PTO card 228k or systems check card 228i is displayed when the associated toggle 314 is switched to the off position, the PTO card 228k or systems check card 228i, respectively, may be removed from the pagination 300 and the card after/below the PTO card 228k or systems check card 228i may become the current visible card. If the PTO card 228k or systems check card 228i is not displayed when the associated toggle 314 is switched to the off position, the PTO card 228k or systems check card 228i may be removed from the pagination 300 and the currently displayed card may continue to be displayed.

In some examples, while in drive mode, the driver may not be enabled to interact with a displayed card 228 while driving. When the vehicle 102 is in park mode, the driver may also be enabled to navigate through a card 228 by turning the cluster control 122b clockwise or counterclockwise, and may be further enabled to use a select button 312 included on the cluster control 122b to activate and interact with contents included in a displayed card 228. For example, a custom view card 228d may be provided that may include content selected for inclusion by the driver. As will be described in further detail below, while in park mode, the driver may be enabled to select the custom view card 228d to edit the contents of included in the custom view card 228d.

Figure 4A:
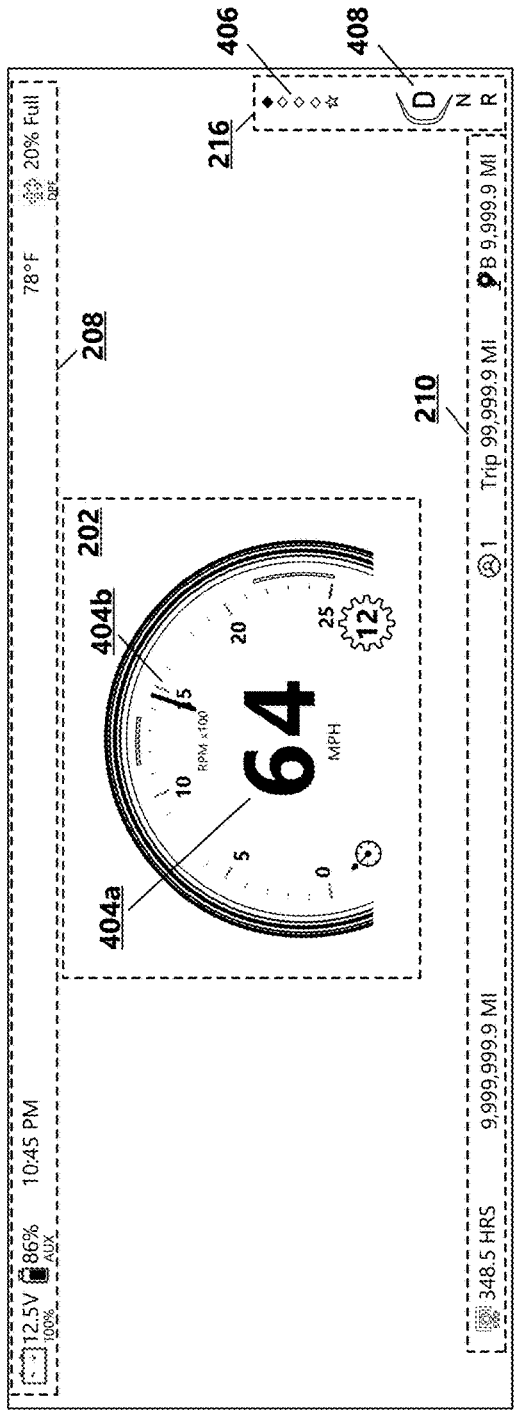
FIG. 4A is an illustration of an example instrument panel in a first minimized content view without ADAS features.
Figure 4B:
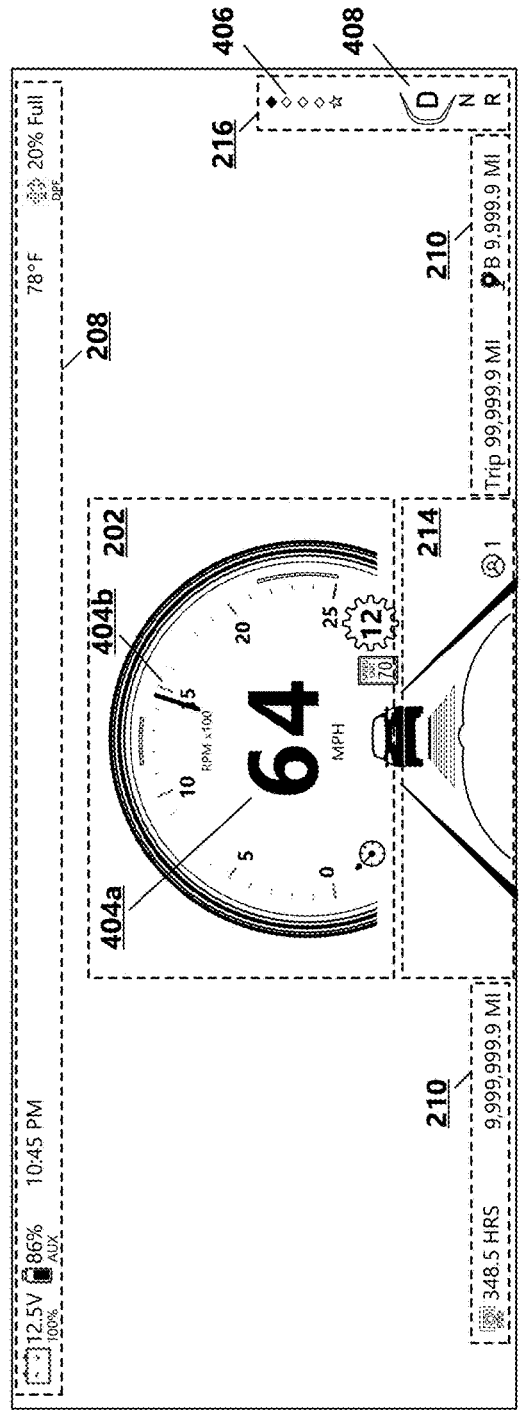
FIG. 4B is an illustration of an example instrument panel in the first minimized content view with ADAS features.
Figure 4C:
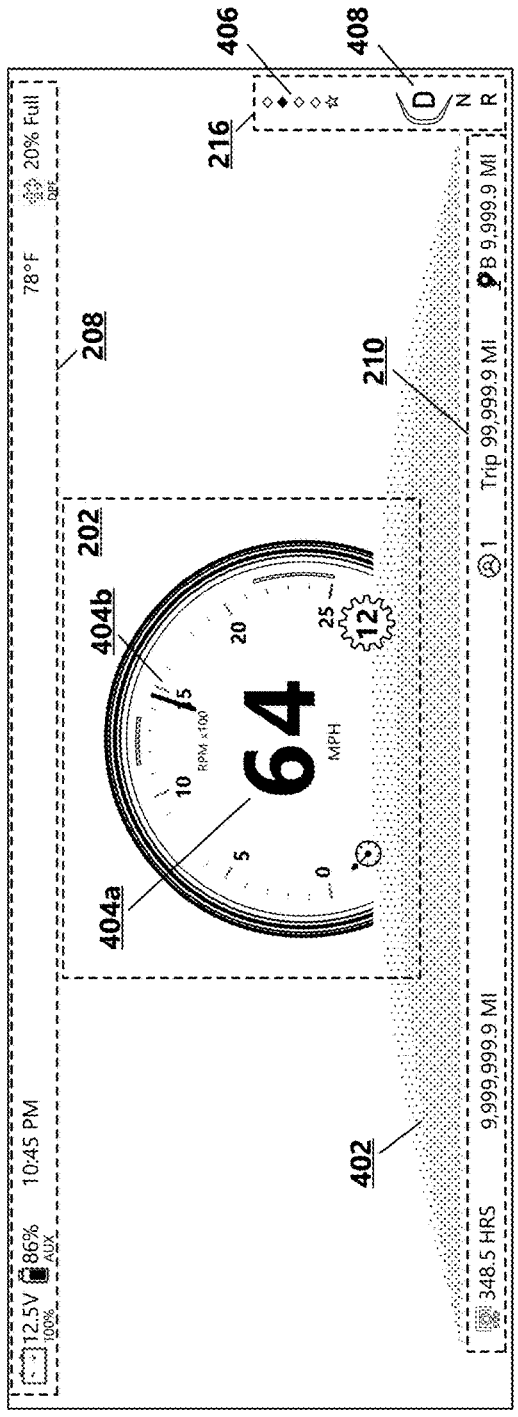
FIG. 4C is an illustration of the example instrument panel in a second minimized content view without ADAS features.
Figure 4D:
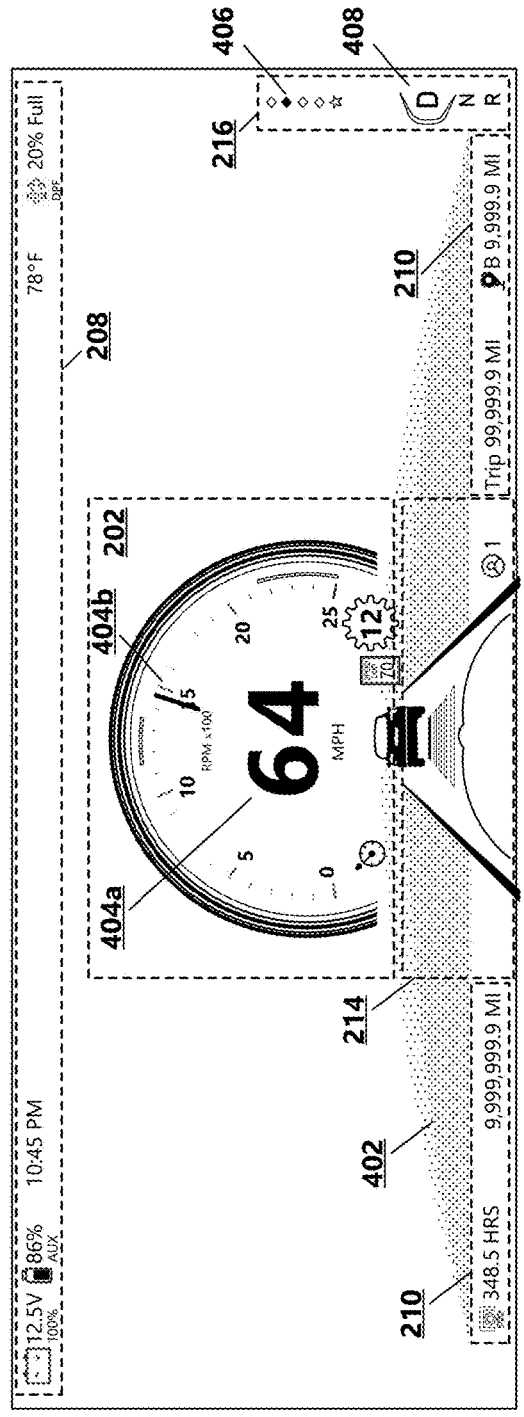
FIG. 4D is an illustration of the example instrument panel in the second minimized content view with ADAS features.

FIGS. 4A-B show illustrations of an example instrument cluster 106a in the first minimized content view 302 and FIGS. 4C-D show illustrations of an example instrument cluster 106a in the second minimized content 304 view. According to an aspect, the minimized content views 302, 304 include a minimal amount of information that can be displayed to the driver while the vehicle 102 is in a driving mode (e.g., drive, neutral, or park), while suppressing a display of other (e.g., basic or enhanced content view) gauges that may be within normal usage ranges (e.g., as opposed to out-of-parameter or warning ranges). For example, when other gauges are within normal usage ranges, the driver may not need to monitor them. As such, suppression of the other gauges in the minimized content view may reduce driver distractions and may also allow for a dark cockpit mode that may provide for better driver night vision. In some examples, in the first minimized content view 302, a visual background of the instrument cluster 106a may be simplified, and in the second minimized content view 304, the visual background of the instrument cluster 106a may include artistic design elements 402, such as a displayed pattern or shading. In some examples, the first minimized content view 302 may provide for a darkest-level dark cockpit mode that may provide for increased driver night vision. In some examples, the visual background of the instrument cluster 106a in the basic content view 306 and the enhanced content view 308 may also include the artistic design elements 402.

In the illustrated examples, the pagination indication 406 is shown as a sequence of indicators representing each available content view, wherein the sequence corresponds to the scrollable order of available content views (e.g., scrollable via user interaction with the cluster control 122). In some examples, the first indicator may represent the first minimized content view 302, the second indicator may represent the second minimized content view 304, the third indicator may represent the basic view 306, the fourth indicator may represent the enhanced view 308, and the fifth indicator may represent the favorites view 310 (described below in further detail). In other examples, the indicators included in the pagination indication 406 may represent the primary gauges card 228a, the secondary gauges card 228b, the additional gauges card 228c, the custom view card 228d, the TPMS card 228e, the menu card 228f, the trip summary card 228g, the ADAS card 228, the post tip card 228j, and/or the PTO card 228k. A currently-displayed content view/card may be indicated by an increased saliency of the associated indicator included in the pagination indication 406.

According to an example and as illustrated in FIGS. 4A-B, when in the first minimized content view 302, the pagination indication 406 and a drive mode indication 408 included in the side bar 216 may indicate that the first minimized content view 302 is displayed and the control position of the active gear (e.g., drive, neutral, or reverse), respectively. As illustrated in FIGS. 4C-D, when in the second minimized content view 304, the pagination indication 406 included in the side bar 216 may indicate that the second minimized content view 304 is displayed. Additionally, when in the minimized content view 302,304, vehicle status-related information may be shown in the first gauge zone 202. In some examples, the first gauge zone 202 may include at least a display of information associated with the vehicle's road speed and the vehicle's engine speed. For example and as illustrated, minimal view gauges 404 included for display in the minimized content view 302,304 may include a speedometer 404a and a tachometer 404b. In the example illustrated, the speedometer 404a is displayed in a digital format and the tachometer 404b is displayed as an analog gauge. Other configurations of the speedometer 404a and/or the tachometer 404b are possible and are within the scope of the present disclosure. As illustrated, in the minimized content view 302,304, the top bar 208 and bottom bar 210 may additionally be displayed. As shown in the example illustrations in FIGS. 4B and 4D, when the vehicle 102 is configured with an ADAS and when the ADAS is active, in the minimized content view 302,304, the instrument cluster 106 may further include a display of ADAS-related passive and/or active driver assistance information, settings, and warnings in the ADAS zone 214.

Figure 5:
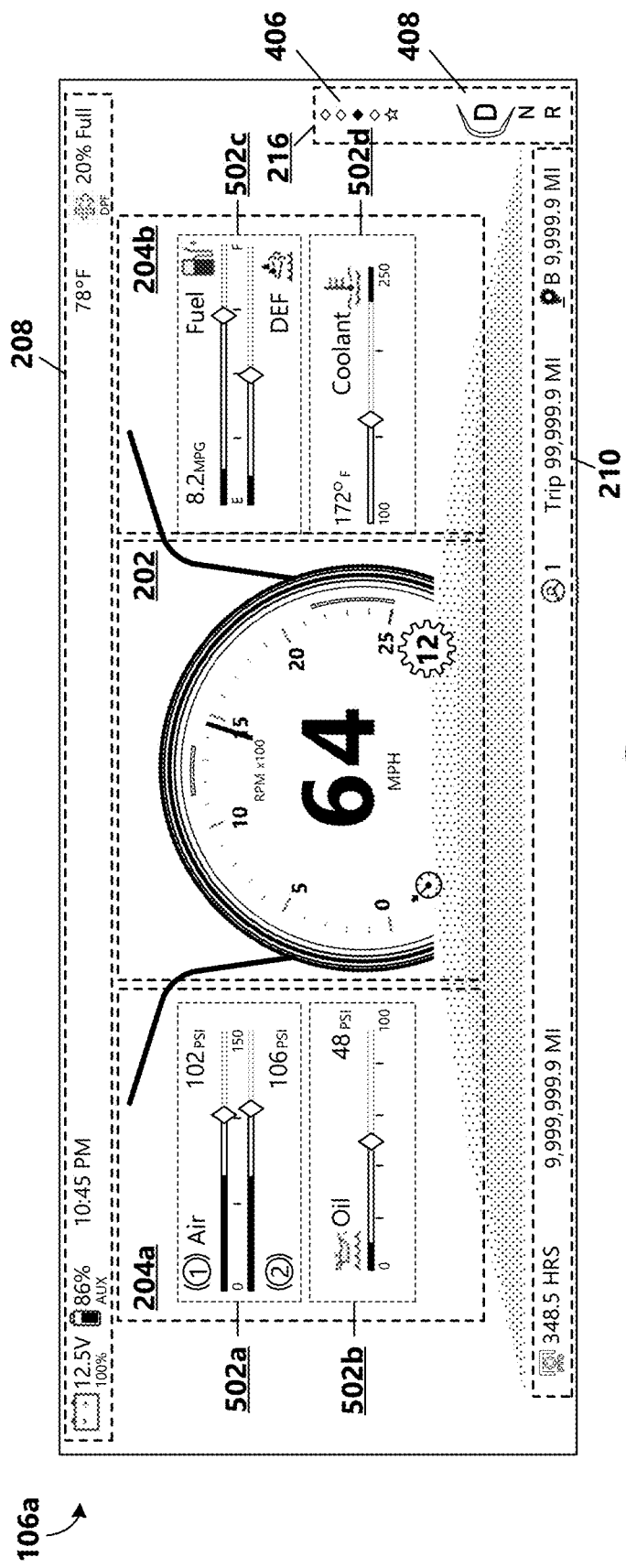
FIG. 5 is an illustration of the example instrument panel in a basic content view.

With reference now to FIG. 5, an illustration of an example instrument cluster 106a shown in a basic content view 306 is shown. As illustrated, when in the basic content view 306, the pagination indication 406 included in the side bar 216 may indicate that the basic content view 306 is displayed, and vehicle status-related information may be shown relative to the first gauge zone 202 and the second gauge zones 204. According to an aspect, the basic content view 306 may include a display of information that may be typically provided by basic view gauges included in an instrument cluster of a vehicle 102. For example, the basic content view 306 may include a display of minimal view gauges 404 included in the minimized content view in the first gauge zone 202. Additionally, the second gauge zones 204 may include a display of basic view gauges 502, such as: one or more air pressure gauges 502a, one or more oil pressure gauges 502b, one or more fuel level gauges 502c (which may optionally include a diesel exhaust fluid (DEF) level gauge), and one or more water temperature gauges 502d, while suppressing a display of additional gauges that may be within normal usage ranges (e.g., as opposed to out-of-parameter or warning ranges). Although the gauges (e.g., basic view gauges 502 and other gauges) are illustrated as slider gauges, in other examples, the gauges may be displayed as analog gauges. In some examples, the gauges may include a scale, which may or may not include tick-marks, a pointer/indicator that moves in relation to the measurement represented by the particular gauge, and an indication of an out-of-parameter or warning zone. In some examples, the out-of-parameter zone may only be shown and visually highlighted (e.g., in comparison with a pre-warning state) when a measurement is in the out-of-parameter zone.

According to an aspect, the basic view gauges 502 may have fixed positions within the second gauge zones 204 (e.g., air pressure gauge(s) 502a in an upper portion of the left second gauge zone 204a, oil pressure gauge(s) 502b in a lower portion of the left second gauge zone 204b, fuel gauge(s) 502c (e.g., one or a combination of: a single fuel gauge, multi-fuel gauge, DEF gauge) in an upper portion of the right second gauge zone 204b, and water temperature gauge(s) 502d in a lower portion of the right second gauge zone 204b. In some examples and as shown in FIG. 5, when the basic content view 306 is shown and when additional gauges (e.g., that may be selected for inclusion in the enhanced content view) are within normal usage ranges and suppressed from display, the second gauge zone 204a,b and the basic view gauges 502 may be sized to fill the available instrument cluster 106a screen space. Alternatively, if a non-displayed gauge goes into an out-of-parameter or warning range, a second gauge zone 204a,b (e.g., on a left or right side depending on the enhanced content view gauge 602 that is in an out-of-parameter or warning range) and the basic view gauges 502 included in the second gauge zone 204a,b may be resized to a smaller size so that a warning gauge can be unhidden. In some examples, when a non-displayed gauge goes into an out-of-parameter or warning range, the gauge information that goes into the out-of-parameter or warning range may be dynamically shown on the display screen 128 via a dynamic container.

Figure 6A:
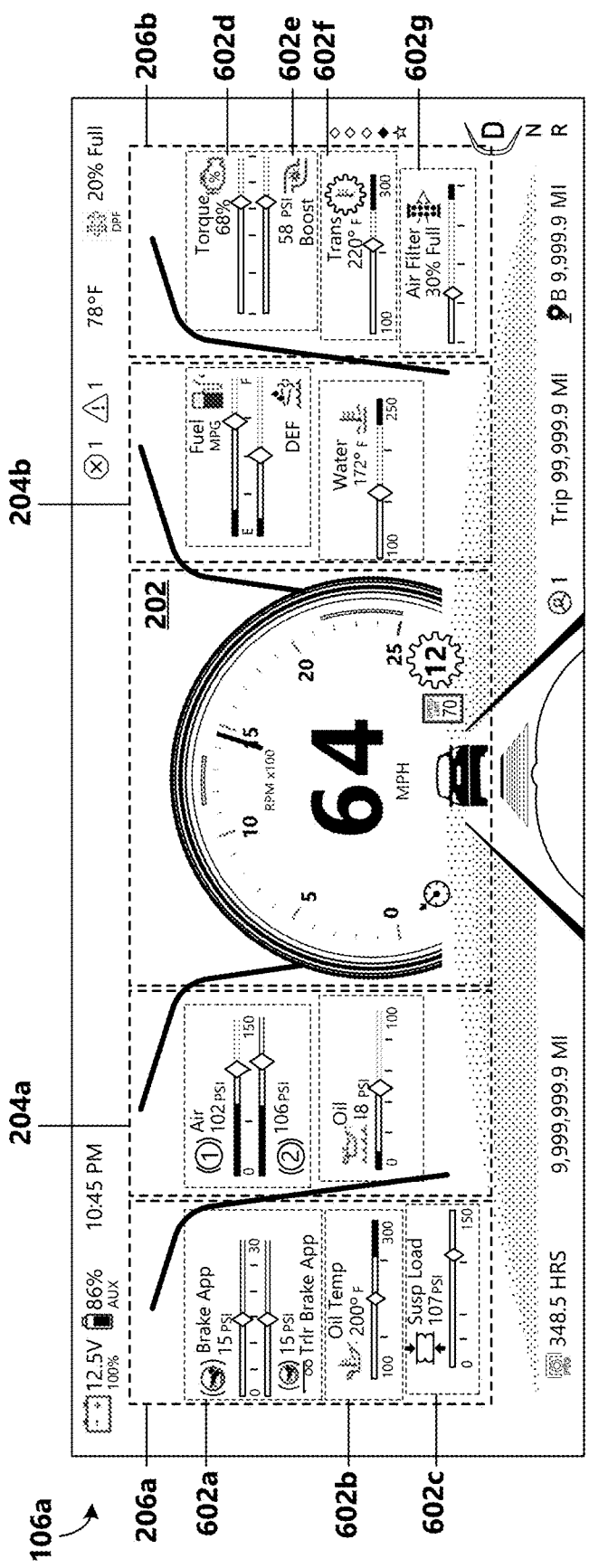
FIG. 6A is an illustration of the example instrument panel in an enhanced content view.

With reference now to FIG. 6A, an illustration of an example instrument cluster 106a shown in an enhanced content view 308 is shown. As illustrated, when in the enhanced content view 308, the pagination indication 406 included in the side bar 216 may indicate that the enhanced content view 308 is displayed, and vehicle status-related information may be shown relative to the first gauge zone 202, the second gauge zones 204, and the third gauge zones 206. According to an aspect, the enhanced content view 308 may include additional vehicle status-related information (e.g., conditional and/or optional gauge content) that may be specific to the build configuration of the vehicle 102. For example, the enhanced view gauges 602 included in the enhanced view 308 may be defined by the truck order configuration and the layout may be determined by the gauge layout application 130. The enhanced content view 308 may include a display of minimal view gauges 404 included in the minimized content view 302,304 in the first gauge zone 202, a display of basic view gauges 502 included in the basic content view 306 in the second gauge zone 204, and additionally, in the third gauge zones 206, may include a display of one or more enhanced view gauges 602, such as but not limited to: a brake application gauge(s) 602a (e.g., truck and trailer brake application), an engine oil temperature gauge 602b, air suspension gauge(s) 602c, a torque gauge(s) 602d, a boost gauge 602e, a transmission oil temperature gauge 602f, an air filter gauge 602g, a steering axle temperature gauge 602h (shown in FIG. 7A), a front-rear axle temperature gauge 602i (shown in FIG. 7A), a center-rear axle temperature gauge 602j (shown in FIG. 7A), a rear-rear axle temperature gauge 602k (shown in FIG. 7A), a fuel filter restriction gauge (not shown), an auxiliary transmission temperature gauge (not shown), a transfer case oil temperature gauge (not shown), an electric current/ammeter gauge (not shown), and a trailer reservoir pressure gauge (not shown).

According to an aspect, the layout of the enhanced view gauges 602 is variable depending on how the vehicle was ordered and depending on how the enhanced view gauges 602 may be pre-prioritized and stored into memory. In some examples, basic view gauges 502 may be standard across various vehicles, but the expanded gauges 602 (e.g., selection of and display position) may be specific to the vehicle build configuration and priority of available gauges. In some examples, the instrument cluster UI engine 104 may include or be communicatively connected to the gauge layout application 130 comprising logic rules (e.g., a priority level, warning state, grouping) and layout rules that may be used by the instrument cluster UI engine 104 to select inclusion and placement of gauges in the various content views 302-310 and cards 228.

According to an aspect, the gauge layout application 130 is illustrative of a software module, system, or device that is operative or configured to provide a configuration function for specific vehicles. For example, gauge layout application 130 may comprise logic programs, priority assignments, and assigned rule sets used to determine the dynamic placement of enhanced 602 gauges onto the instrument cluster 106 display interface. The gauge layout application 130 may be configured to address an increased complexity of gauge display and layout in a digital instrumentation system implementation, instead of simply having to address physical space locations. The gauge layout application 130 may further include logic for determining which gauges may be co-located or grouped together and how those groups may fit into the instrument cluster 106 interface relative to other gauges. In some examples, the gauge layout application 130 may provide a systematic and repeatable method of performing a consistent content layout of variable gauges on a digital instrumentation system, while accommodating the actual variability of a production truck environment (e.g., cars may not have the same instrumentation variability requirements as trucks). In some examples, the gauge layout application 130 may further enable a fleet manager to configure or control what is shown to a driver. In some examples, the gauge layout application 130 may be further configured to determine which gauges may be suited for inclusion in a dynamic container in normal views.

In some examples, a gauge may be displayed in the instrument cluster 106 interface as a single gauge or as part of a group of gauges (e.g., double, triple, or quadruple (quad)) based on various rules. For example, a single gauge may be a stand-alone gauge that may appear as a single gauge either because it exists only as a single gauge (e.g., an oil temperature gauge 602*b*) or because another gauge that it may be combined with is not available for the particular vehicle 102. Other example single gauges may include an air filter gauge 602*g*, a single drive axle oil temperature gauge 602*i,k*, an ammeter, and a trailer reservoir air pressure gauge.

In some examples, based on a determination made by the gauge layout application 130, a gauge may be shown in different formats to conserve display area by either combining gauge functions or by compressing the gauge information to make room for additional gauges to be displayed.

As an example, in the enhanced content view 308, the appearance of a dynamic container (i.e., a container that may be dynamically displayed when a non-displayed gauge that may not have an assigned position in the enhanced content view is out-of-parameter (pre-warning) or in warning state) may cause the enhanced view gauges 602 displayed above the dynamic container to be transitioned into a compact mode (e.g., a smaller version so that there is room for the dynamic container). When the dynamic container disappears, the compact mode the compacted enhanced view gauges 602 may transition back to their normal view.

As another example, the gauge layout application 130 may be configured to combine two or more gauges that can share a same scale in a super gauge. For example, a super gauge can include a plurality of gauges combining multiple readouts into one gauge footprint. An example of a super gauge is the brake application gauge(s) 602*a* that combines a truck application pressure gauge and a trailer brake application pressure gauge, and uses one gauge footprint and shares a scale. Other example super gauges may include an air suspension super gauge, a fuel and air filter super gauge, various axle oil temperature combinations, and super gauges for various combinations of transmission oil temperature, transfer case oil temperature, and auxiliary transmission oil temperature.

As another example, the gauge layout application 130 may be configured to make a determination as to whether two or more gauges may be related and can be brought together in a combination (combo) gauge that may or may not share a same scale. An example of a combo gauge is the combination of the torque gauge 602*d* and the boost gauge 602*e* into one gauge footprint (as indicated by the dotted outline). In this example, the torque gauge 602*d* and the boost gauge 602*e* share a scale, but use different units of measure. In some examples, when two or more gauges are assigned to each other either as a super gauge or as a combo gauge as part of a truck configuration, then the two or more gauges may be displayed as such.

With reference now to FIGS. 7A and 7B, two examples 702,704 of a same space (e.g., the left third gauge zone 206*a*) of an instrument cluster 106 interface are shown used for two different vehicle configurations. For example, the gauges selected for inclusion in the instrument cluster 106 may be determined based on the specific build configuration of the vehicle 102. In the illustrated examples, the two vehicles 102 corresponding to the two displayed instrument clusters 106 may have a different layout of axles (with temperature gauges). Accordingly, the gauges included in the two instrument clusters 106 and the layout of the gauges selected for inclusion may differ based on priority and layout determinations made by the gauge layout application 130. In this case, the gauge layout application 130 may make a determination to include the brake application gauge 602*a* in the enhanced content view in both examples 702,704 (e.g., the brake application gauge 602*a* may have a relatively high priority ranking according to a hierarchy). Additionally, the gauge layout application 130 may make a determination to combine the axle temperature gauges 602*h-k* (first example 702), 602*i-k* (second example 702) of each vehicle 102 into super gauges. Because the first vehicle 102 (in the first example 702) is configured with more axles than the second vehicle 102 (in the second example 704), the gauge layout application 130 may make a determination that a third gauge may not fit and may make a determination as to which gauge may need to be removed based on a hierarchy. For example, in the first example 702, the gauge layout application 130 may determine that the suspension load gauge 602*c* is ranked/ordered lower in priority than the brake application gauge 602*a* according to a hierarchy, and may be removed from the default layout in order to fit the additional axle temperature gauges 602*h,j*.

Figure 6B:
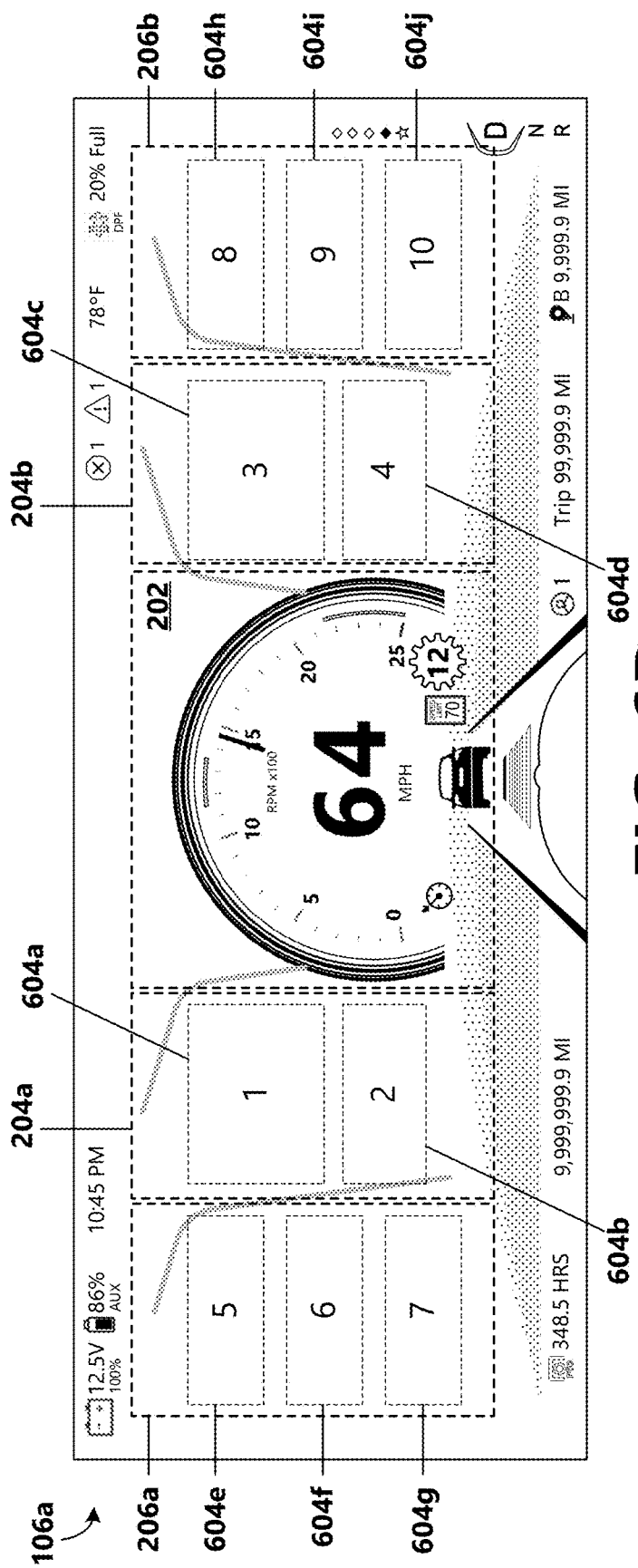
FIG. 6B is an illustration of example gauge containers that may be used to position gauges.

According to an aspect and with reference to FIG. 6B, in the enhanced content view 308, each third gauge zone 206a,b may include up to N containers 604a-n (generally 604) that may be configured to hold a single gauge or a group of gauges. As one example, in the example instrument cluster 106a illustrated in FIG. 6B, the left second gauge zone 204a may include two containers 604 (e.g., container 1 604a and container 2 604b), the right second gauge zone 204b may also include two containers 604 (e.g., container 3 604c and container 4 604d), the left third gauge zone 206a may include three containers 604 (e.g., container 5 604e, container 6 604f, and container 7 604g), and the right third gauge zone 206b may also include three containers 604 (e.g., container 8 604h, container 9 604i, and container 10 604j). According to an aspect, each container 604 may have predetermined rules that define whether it can hold a single gauge or a group of gauges. For example, container 5 604e, container 6 604f, container 8 604h, and container 9 604i may be configured to hold single, double/dual, triple, or quad format gauges, while container 7 604g and container 10 604j may be configured to only hold single format gauges. As can be appreciated, due to limited display space when in the enhanced view, the number and format of gauges that may be populated when in the enhanced view may change when using triple or quad gauges and dynamic containers for warnings.

In some examples, different gauge formats (e.g., single, double, triple, quad) may have different assigned point values, and each container 604 may have a set of rules that define what gauge format can be placed in it to ensure space constraints of the containers 604, gauge zones, or sides (e.g., left-hand side and/or right-hand side of the first gauge zone 202) can be met. For example, a single format gauge may have an assigned point value of 1, a double/dual format gauge may have an assigned point value of 2, a triple format gauge may have an assigned point value of 3, and a quad format gauge may have an assigned point value of 3. One example rule that may specify that the left-hand side or the right-hand side of the first gauge zone 202 may hold up to a defined maximum point value (e.g., 4 points). Accordingly, various combinations of gauge formats on a side that have a total point value equal or less than the maximum point value may be allowed. Various example gauge format combinations 606a-v (generally 606) based on the example assigned point values and maximum point value for a side are illustrated in FIGS. 6C, 6D, and 6E. For example, FIG. 6C shows various single format gauge combinations 606a-g that may be allowed on a side based on the example point values and maximum point value (e.g., left-hand side including one or more of the following containers: container 5 604e, container 6 604f, and container 7 604g; or right-hand side including one or more of the following containers: container 8 604h, container 9 604i, and container 10 604j). FIG. 6D shows various double format gauge combinations 606h-p that may be allowed on a side based on the example point values and maximum point value. As illustrated, the example double format gauge combination 606p includes an "x" in association with the bottom container (e.g., container 7 604g or container 10 606j), wherein the "x" represents an empty space. For example, when 4 points of gauges exist on a side (e.g., a top and middle container on the side may each include a dual format gauge), any remaining containers (e.g., container 7 604g or container 10 606j) may not be allowed to hold a gauge. FIG. 6E shows various triple or quad format gauge combinations 606q-v that may be allowed on a side based on the example point values and maximum point value. As should be appreciated, the point values and maximum point value described above are one example. Other point values and other maximum point values may be defined, which may provide for additional or alternative combinations of gauge formats.

In some examples, a rule may be assigned to a container 604 that may define specific gauges that may or may not be allowed in the container based on one or more characteristics of the gauge (e.g., type of scale, whether the gauge includes tick marks). In some examples, if a gauge is larger than its container 604, the gauge may extend above the container area as needed, or may occupy more than one container. For example, if a grouped gauge exceeds containing two gauges (e.g., drive axle temperature gauges), the grouped gauge may occupy more than one container 604.

Figure 8:
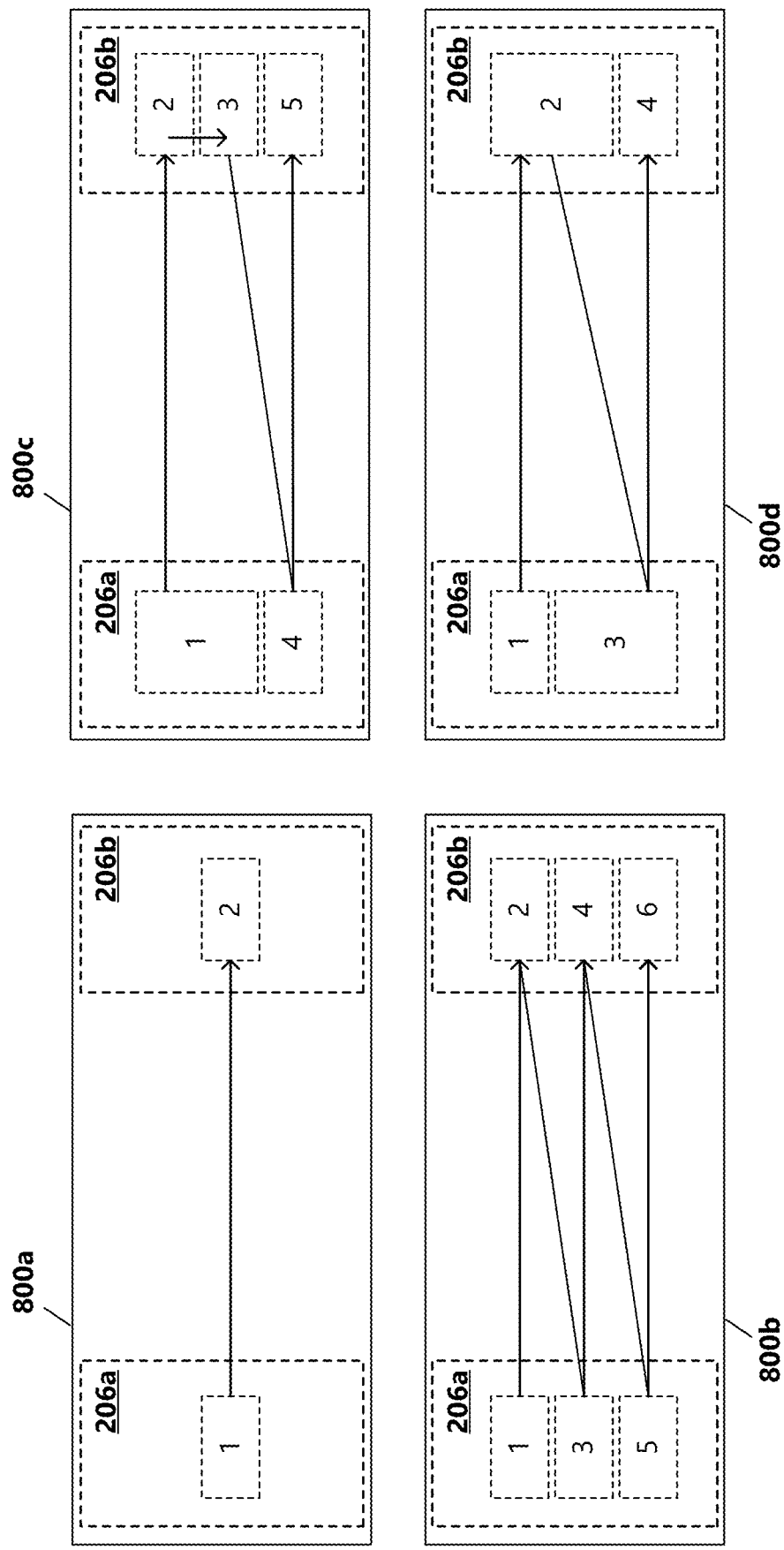
FIG. 8 is an illustration of example gauge container-based layout templates used for determining a layout of gauges.

According to an aspect, various container-based layout templates may be provided depending on selected or specified gauges for a certain vehicle configuration. Once a template is defined by a gauge permutation list by the gauge layout application 130, the layout template may not change (with an exception of a user-defined favorites view as described below). Some illustrative examples of container-based layout templates 800a-d (generally 800) are shown in FIG. 8. The example container-based layout templates 800 show example placements of gauges in the left third gauge zone 206a and the right third gauge zone 206b. As should be appreciated, although not illustrated, basic view gauges 502 (e.g., air pressure gauge(s) 502a, oil pressure gauge(s) 502b, fuel gauge(s) 502c (e.g., one or a combination of: a single fuel gauge, multi-fuel gauge, DEF gauge), and water temperature gauge(s) 502d) may be placed in containers 604 in the second gauge zones 204a,b.

Figure 9:
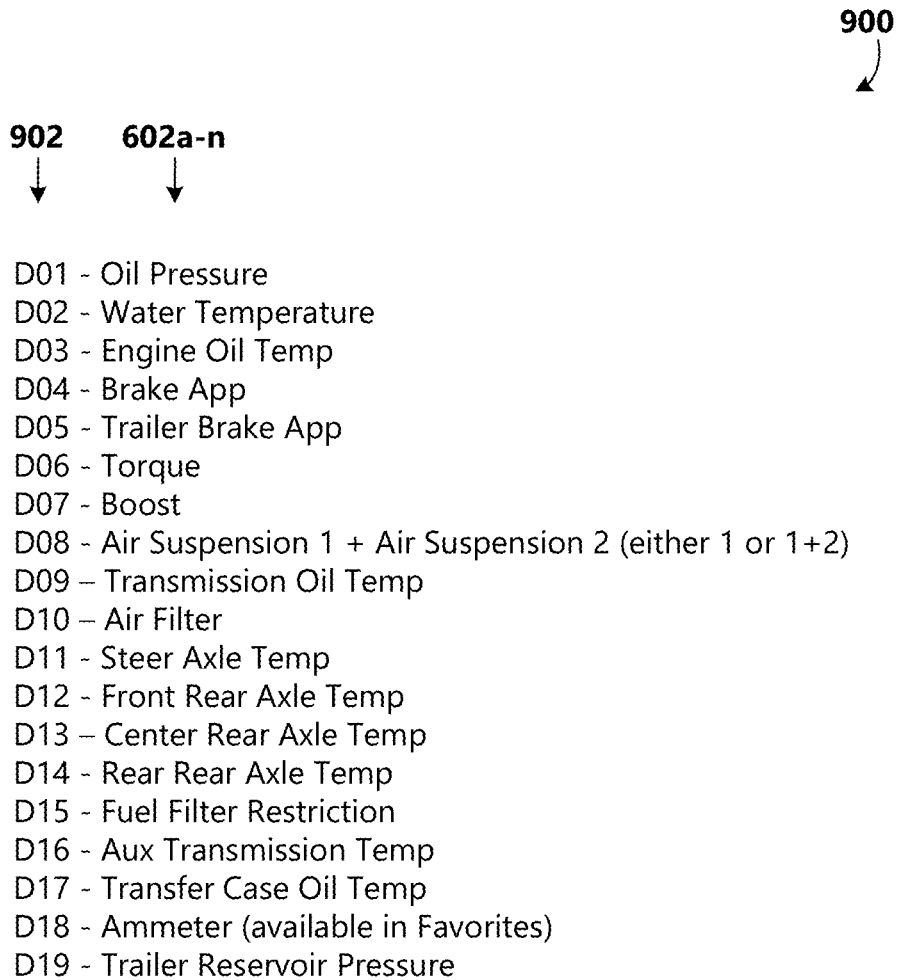
FIG. 9 is an illustration of an example gauge hierarchy that may be used to influence the order and positions of gauges.

In some examples, placement of enhanced view gauges 602 may include placement of gauges alternating between sides to maintain symmetry about the basic view, wherein gauges may be populated according to a hierarchy (described below). With reference to FIG. 8, the gauge layout application 130 may apply a first layout template 800a when there are one or two single or grouped (e.g., dual, triple, or quad) enhanced view gauges 602 added in addition to the basic view gauges 502. According to an example, if there is only one enhanced view gauge, container position 1 may be used. If there are two enhanced view gauges 602, container position 1 and 2 may be used and both gauges may be shown/hidden at the same time. In some examples, the gauge layout application 130 may apply the second layout template 800b to display one grouped gauge in each third gauge zone 206a,b. The order may be determined based on a hierarchy and layout rules. For example, not all available gauges may be displayed at the same time in the expanded content view (e.g., due to space restrictions, minimizing driver distraction, minimizing information overload). One example gauge hierarchy 900 that may be used to influence the order of enhanced view gauges 602 and their positions in the third gauge zones 206 is illustrated in FIG. 9. The example gauge hierarchy 900 may be used when the vehicle 102 is in drive mode, wherein the hierarchy 900 may include an order ranking 902 and the associated enhanced view gauge 602. As can be appreciated, other hierarchies are possible and are within the scope of the present disclosure. One example layout rule may dictate that if two grouped gauges are positioned by their order below each other, then the opposite gauge on the other side will switch container positions.

In some examples and with reference again to FIG. 8, the third layout template 800c may apply when a truck configuration needs a triple or quad format gauge. One example layout rule may dictate that depending on the gauge order ranking 902 number, the large container may appear also on the right side, or container positions 1 and 4 can switch positions. Another example layout rule may dictate that if the enhanced view gauge 602 in container position 1 is a triple or quad format gauge, then container position 4 cannot contain another grouped gauge.

In some examples, the fourth layout template 800d may be used in an edge case, in which a truck configuration may be determined (e.g., by the gauge layout application 130) to need up to two triple or quad format gauges. In this case, both third gauge zones 206a,b may include a large triple or quad gauge container and a single or dual format gauge container. The order can be changed appropriate to gauge order ranking 902 numbers. One example exception may be that two triple or quad format gauges may not be placed on the same side. One example layout rule may dictate that two dual format gauges can be in one column (e.g., fill container positions 1 and 3). Another example layout rule may dictate that a column including one triple or quad format gauge may include another single gauge. Additional and/or alternative layout rules may be included and are within the scope of the present disclosure.

In some examples, the instrument cluster UI engine 104 may be configured to provide a favorites or custom function that enables a driver to customize a content view (e.g., outside of the default minimized-to-maximized content views and cards 228). The favorites or custom function may allow for a driver-selectable set of gauges to be configured as a favorites view 310 or a custom view card 228d.

In some examples, a fleet manager may use the favorites view 310 or custom view card 228d to configure an alternative gauge set for a specialized usage. For example, at a factory order time, the favorites view 310 or custom view card 228d may be pre-configured to include a specific set of "work" gauges for a particular task (e.g., an operation, such as a PTO operation mode). In some examples, a fleet manager may be enabled to lock a pre-configured favorites view 310 or custom view card 228d from driver manipulation or disable the favorites/custom function should they not want the driver to have access to this level of customization. In some examples, a particular favorites view 310 or custom view card 228d may be associated with a particular driver. According to an aspect, the favorites/custom function may allow the driver to place any available gauge into his/her own custom configuration screen setup. In one example, a favorites view 310 may allow for configuring a custom set of up to sixteen gauge items in the enhanced content view 308 when utilizing grouped gauging. In some examples, an indication of the driver's identity may be received by the instrument cluster UI engine 104, and be used to retrieve a favorites/custom gauge set configuration associated with the driver's identity. In some examples, when utilized with a driver profiles feature (described below), a vehicle 102 can provide a plurality of favorites views 310 or custom view cards 228d, wherein each driver of a plurality of drivers may have his/her own gauge set configuration. In some examples, the favorites view 310 or custom view card 228d can auto-suggest or be auto-populated with a set of gauges intelligently determined based on driving behavior or application.

Figure 10:
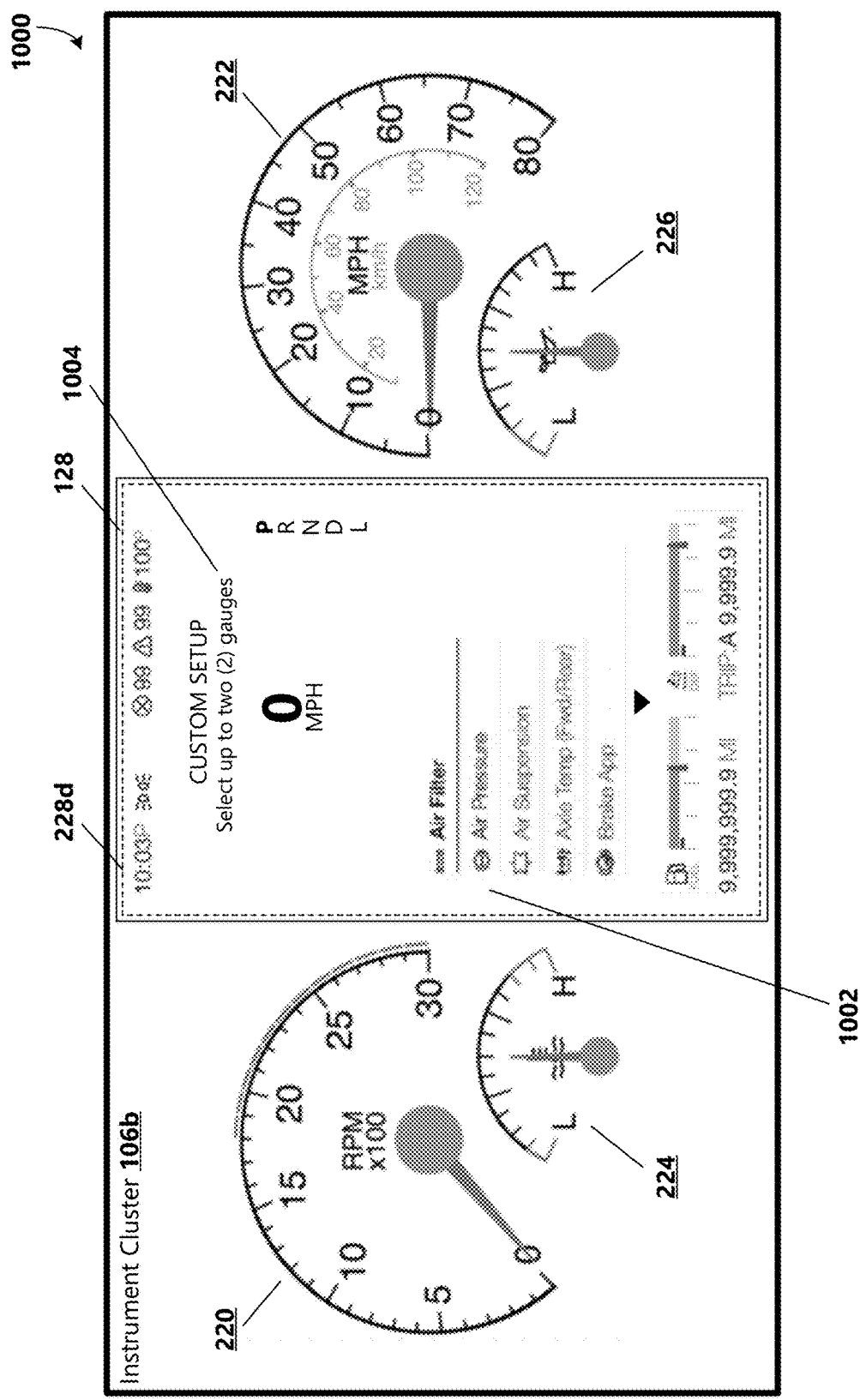
FIG. 10 is an illustration of an example custom view card setup mode.
Figure 11:
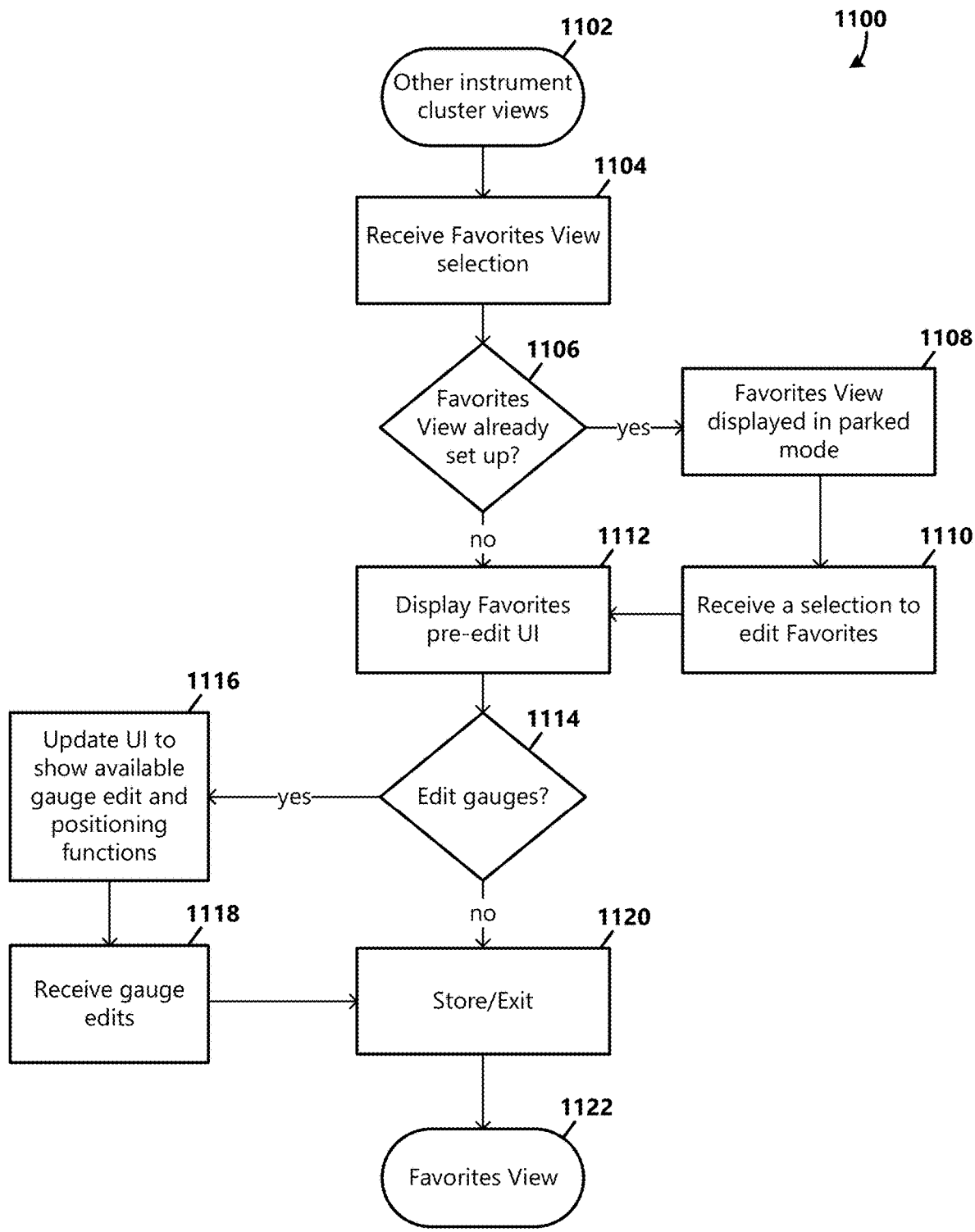
FIG. 11 is a flow diagram depicting general stages of an example process for setting up a favorites view.

An example custom view card 228d displayed in a setup mode 1000 is illustrated in FIG. 10. In some examples, the custom view card 228d may be displayed in setup mode 1000 until a custom configuration is saved. When the vehicle 102 is in park mode, the driver may be enabled to provide a user input, such as an actuation of the select button 312 included on the cluster control 122b, to enter the setup mode 1000. In some examples, when the setup mode 1000 is activated, the driver may be enabled to dial through a list of available gauge options 1002. The gauges options 1002 shown may correspond with be active and available sensors on the vehicle 102 (e.g., as opposed to a list of all possible options). If a sensor is added to the vehicle 102 (e.g., after production, by a dealer), an automatic detection or service tool process may be performed, wherein the sensor may be detected and a corresponding gauge option 1002 may be included in the list and made available for selection. In some examples, messaging 1004 may be included to assist the driver through the custom view card 228d setup process. In some examples, the gauge option list may include gauge grouping associated functions, wherein when two or more gauge options 1002 that can logically be grouped together are selected for inclusion in the custom view card 228d, the two or more gauge options 1002 may be automatically combined as a grouped gauge and account for a single gauge option selection. After selected gauge options 1002 are saved, the associated gauges may be displayed in the custom view card 228 when the custom view card 228 is selected for display in the instrument cluster 106b. An example favorites view 310 setup process 1100 is illustrated in FIG. 11, and examples of favorites view 310 setup UIs 1200 are illustrated in FIGS. 12A-E. With reference now to FIG. 11, the process 1100 may start from a display of another instrument cluster content view (e.g., minimized content view 302,304, basic content view 306, or enhanced content view 308) while the vehicle 102 is in a parked mode at START OPERATION 1102. In some examples, the displayed content view may be based on whether the display of the instrument cluster 106 is associated with a first time vehicle experience. For example, if it is a first time vehicle experience, a default view, such as one of the minimized content view 302,304, the basic content view 306, or the enhanced content view 308 may be displayed. In other examples, if it is not a first time vehicle experience, and if driver profiles are set up, a default content view or the driver's most-recent content view (e.g., based on an active driver profile) be displayed. In other examples, if driver profiles are not set up, a default or most recently-displayed content view may be shown.

At OPERATION 1104, an indication of a driver selection of the favorites view 310 via actuation of the cluster control 122 may be received. At DECISION OPERATION 1106, a determination may be made as to whether the favorites view 310 has been previously set up (e.g., whether favorites data is stored). In some examples, a favorites view setup process may be performed at vehicle build time or by a fleet manager. In some examples, the determination is made based on whether the favorites view 310 has been previously set up for the current driver. For example, an indication of the driver's identity may be received and linked to a particular driver's stored settings.

When a determination is made at DECISION OPERATION 1106 that the favorites view 310 has been previously set up, at OPERATION 1108, the previously-set up favorites view 310 may be displayed in a parked mode.

At OPERATION 1110, an indication of a selection to edit the favorites view 310 may be received. In some examples, the selection may be made via a press of the cluster control 122. In other examples, the selection may be made via a menu selection.

Figure 12A:
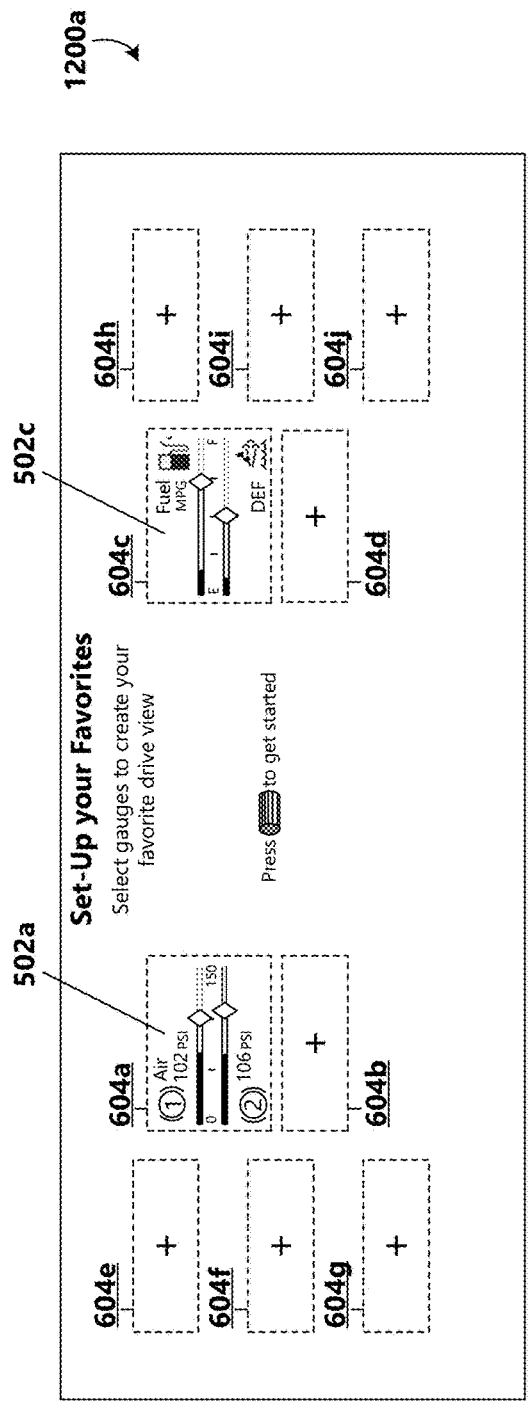
Figure 12B:
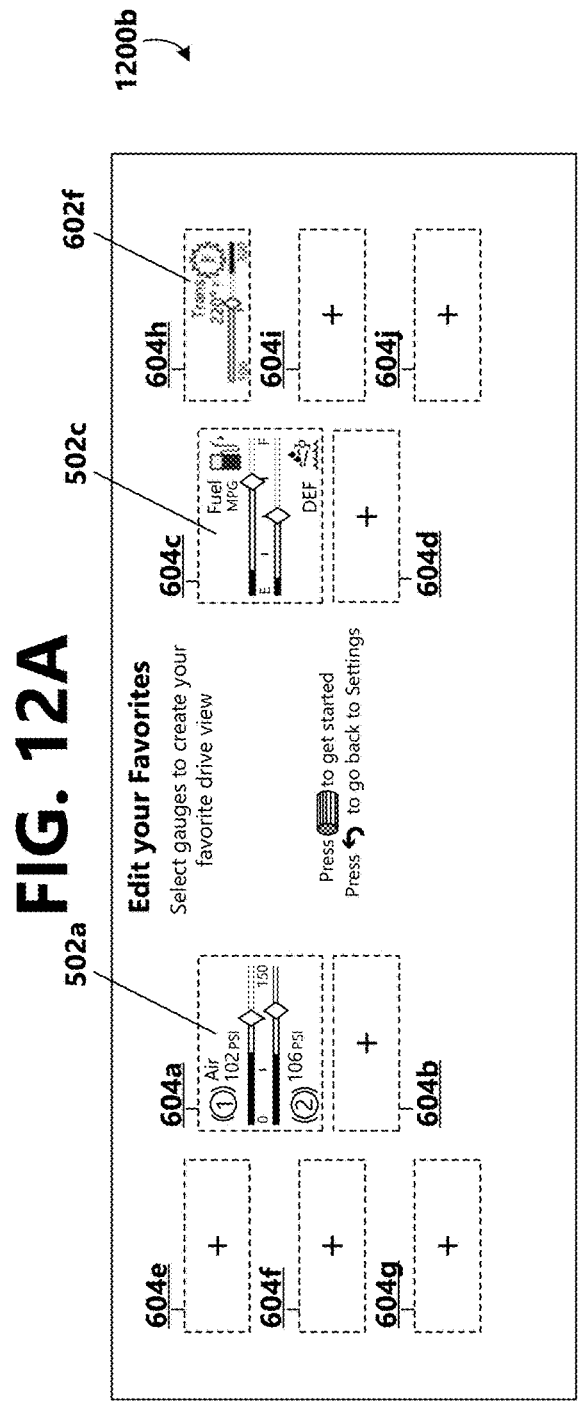

At OPERATION 1112, a favorites pre-edit UI 1200a,b may be displayed. In some examples, the favorites pre-edit UI 1200a,b may vary based on whether the favorites view editing process is a first time experience (e.g., first time experience for the vehicle 102, first time experience for the driver) or a subsequent experience. In some examples, the first time experience determination may be made based on whether favorites data are saved. With quick reference to FIG. 12A, an example set-up favorites pre-edit UI 1200a (i.e., a first-time experience version of the favorites pre-edit UI) is illustrated. For example, the set-up favorites pre-edit UI 1200a may be displayed for the first time experience. In some examples, the set-up favorites pre-edit UI 1200a may include a guidance message 1206 for the driver. Once a favorites view 310 has been set up, the driver may be directed to an edit favorites pre-edit UI 1200b (i.e., a subsequent experience version of the favorites pre-edit UI 1200b). An example of an edit favorites pre-edit UI 1200b is illustrated in FIG. 12B. According to an aspect, the set-up favorites pre-edit UI 1200a and the edit favorites pre-edit UI 1200b may indicate a plurality of gauge containers 604. An unassigned gauge container 604 may further indicate (e.g., via text or an icon) that a gauge may be added to the container 604. As an example and as illustrated, a plus sign may be displayed in association with an unassigned gauge container 604. In some examples, a gauge may have a fixed position, wherein the gauge may be assigned to a particular container 604, and another gauge may not be assigned to that container. As an example and as illustrated in FIGS. 12A and 12B, the air pressure gauge(s) 502a may be assigned to container 1 604a as a fixed gauge, and the fuel gauge(s) 502c (e.g., one or a combination of: a single fuel gauge, multi-fuel gauge, DEF gauge) may be assigned to container 3 604c as a fixed gauge. According to an aspect and as illustrated, the edit favorites pre-edit UI 1200b may include a display of a gauge that has already been placed in/assigned to a container 604 by a user, such as the transmission oil temperature gauge 602f shown as previously assigned to container 8 604h. As described above, a container 604 may have particular rules associated with it that may dictate which types of gauges it may hold.

With reference again to FIG. 11, at DECISION OPERATION 1114, a determination may be made as to whether a selection is made to edit (e.g., add, replace, remove) gauges in the favorites view 310. When a selection is made to edit a gauge, at OPERATION 1116, the UI may be updated to show options associated with the selected gauge edit function.

Figure 12E:
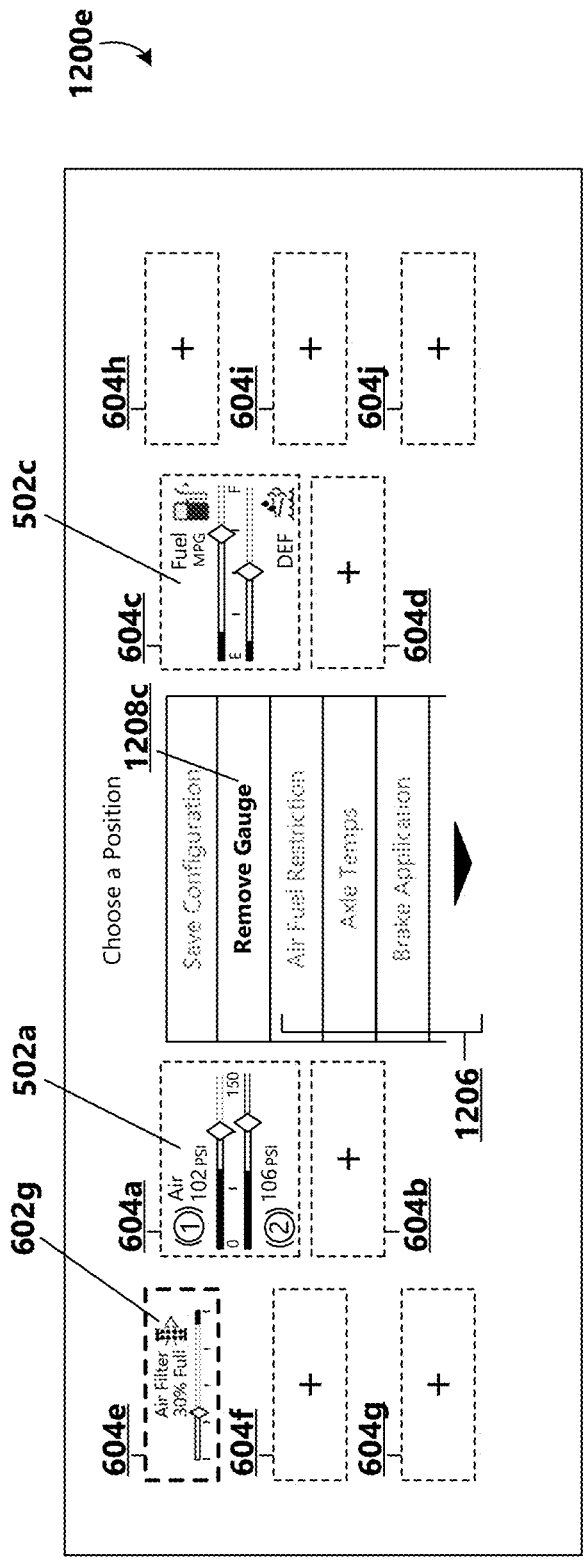

With quick reference to FIGS. 12C-E, example gauge edit functions are shown displayed in example favorites pre-edit UIs 1200c-e. According to an aspect, responsive to an actuation of the cluster control 122, the favorites edit UI 1200c may be displayed and may include a gauge list 1206, wherein the gauge list 1206 includes a scrollable listing of all gauges (e.g., basic level gauges 502 and enhanced gauges 602) that may be available for the specific vehicle 102 (i.e., based on the build configuration of the vehicle 102) and that may be available for selection and placement in a container 604 in the favorites view 310 based on one or more rules. In some examples, gauges that may not be available for selection and placement in a container 604 in the favorites view 310 may be included in the gauge list 1206, but may be grayed-out and non-selectable. For example, a gauge may not be available for selection and placement in a container 604 if the gauge has already been placed in or assigned to a container 604, is part of a combo gauge, or if there are no valid locations in the instrument cluster 106 to add or replace the gauge.

In some examples, the gauge list 1206 is ordered alphabetically by gauge title for better orientation. In some examples, the gauge list 1206 may include associated gauge label names and/or display icons. In one example, a listing of possible gauges (e.g., by gauge title) that may be included in the gauge list 1206 may include, but is not limited to: Air Filter Restriction; Air and Fuel Filter Restriction; Air Suspension 1; Air Suspension 1 and 2; Ammeter; Auxiliary Transmission Oil Temperature; Auxiliary Transmission and Transfer Case Oil Temperatures; Forward Axle Oil Temperature; Forward and Rear Axle Oil Temperatures; All Tridem Axle Oil Temperatures; Steering and Tridem Axle Oil Temperatures; Boost; Brake Application; Brake and Trailer Brake Application; Engine Oil Temperature; Fuel Filter Restriction; Fuel Temperature; Oil Pressure; Torque; Torque and Boost; Trailer Brake Application; Trailer Reservoir Air Pressure; Transfer Case Oil Temperature; Transmission Oil Temperature; Transmission and Auxiliary Transmission Oil Temperature; Transmission and Transfer Case Oil Temperatures; Transmission, Auxiliary, and Transfer Case Oil Temperatures; and Water Temperature.

In some examples, to add a gauge 1202, the driver may use the cluster control 122 to select an available gauge from the gauge list 1206. Upon selection of a gauge from the gauge list 1206, a cursor/highlight may be placed onto the first available gauge container 604 that is allowed to hold the selected gauge (e.g., based on the format of the gauge (single, dual, triple, quad) and rules). The first available gauge container 604 may be first based on a defined scroll select order. If the container 604 is empty, an indication that the selected gauge can be added to the container (e.g., "Add" text, a plus sign) may be displayed. If the highlighted container 604 already has a gauge assigned to it, an indication that the selected gauge can replace the currently-assigned gauge (e.g., "Replace" text) may be displayed. In some examples, containers 604 that are unavailable to place the currently selected gauge by be indicated as such (e.g., grayed-out, omitted from the display, or include "Not Available" text). The user may select to place the selected gauge in the highlighted container 604, or may scroll to the next available container.

As shown in the example illustrated in FIG. 12C, the driver has selected the brake application gauge 1212 from the gauge list 1206; and upon selection of the brake application gauge 1212, the first available container (container 2 604b) according to the defined scroll select order is highlighted. An example scroll select order is represented in FIG. 12C by circled numbers 1-8, wherein the first container 604 in the example scroll select order is represented by the circled number 1 and the last container is represented by the circled number 8. Because container 2 604b does not have a gauge currently assigned to it, the add action option 1208 may be displayed in relation to the container 604b as an available option. Pressing the cluster control 122 may cause the brake application gauge 1212 to be added to the highlighted gauge container 604b. If the user uses the cluster control 122 to scroll to the next container 604, the next container may be highlighted and may display an indication of an available action option 1208.

In some examples, to replace a gauge 1202, the driver may use the cluster control 122 to select an available gauge from the gauge list 1206, and then select a gauge container 1204 holding a previously-assigned gauge. As shown in the example illustrated in FIG. 12D, the driver has selected the brake application gauge 1212 and then scrolled to gauge container 8 604h, which has a previously-assigned transmission temperature gauge 602f. When container 8 604h is highlighted, a replace action option 1208b may be shown added to the highlighted gauge container 604h as an available option. Pressing the cluster control 122 may cause the selected gauge 1212 to replace the previously-assigned gauge 602*f* in the selected gauge container 604*h*. In some examples, when a previously-assigned gauge container is highlighted, the gauge label and values may be hidden from display.

In some examples and as illustrated in FIG. 12E, when there is at least one non-fixed gauge placed in the favorites configuration, the driver may be provided with an option (i.e., remove gauge option 1208*c*) to remove a gauge from the favorites view 310. If there are no placed gauges yet, the remove gauge option 1208*c* may be grayed out and unselectable. When the remove gauge option 1208*c* is selected, the cursor may be cycled through positions with gauges that may be removed. According to an aspect, when a container 604 has a fixed gauge assigned to it, such as container 1 604*a* and container 3 604*c*, the container may not be included in the defined scroll select order. As shown in the example illustrated in FIG. 12E, the driver has selected to remove the air filter gauge 602*g* previously assigned to the highlighted gauge container (container 5 604*e*). Pressing the cluster control 122 may cause the previously-assigned air filter gauge 602*g* from the selected gauge container 604*e*. In some examples, the driver may only be enabled to scroll between previously-assigned gauge containers when the remove gauge option 1208*c* is selected.

With reference again to FIG. 11, OPERATION 1116 may be performed based on a set of favorites layout rules. In some examples, the gauge layout application 130 may use the favorites layout rules to determine which gauges may be added to the favorites view 310, where and how the gauges can be added, and which gauge edit functions may be enabled.

At OPERATION 1118, gauge edits may be received, and at OPERATION 1120, the gauge edits may be stored and the favorites edit UI 1200 may be closed; or if the driver chooses to exit without saving, the gauge edits may not be stored and the favorites edit UI 1200 may be closed. At END OPERATION 1122, the when selected for display in a driving mode, the favorites view 310 may be displayed including the gauges selected for inclusion by the driver.

Alternatively, if the vehicle 102 is in a driving mode and the favorites view mode is selected, but has not been previously set up, the instrument cluster 106 may be shown in a view similar to the minimized content view or the basic content view with indications that the favorites view has not been set up yet and that gauges can be selectively added by the driver. For example, one or more gauge containers 604 may be displayed as unassigned (e.g., the container may be blank, a plus symbol may be included).

In some examples, the instrument cluster UI engine 104 may be further configured to provide a driver profiles function that enables multiple drivers of a vehicle 102 to have personalized views. For example, by having multiple personalized view for a vehicle 102, the driver may be able to conserve time that may have been spent on configuring a personalized view each time the driver drives a shared vehicle. For example, the driver profiles function may retain or access layout preference settings (e.g., favorites view 310 layout), performance data, a last-viewed screen, and other settings for up to N individual drivers, and use the settings and data to provide a personalized and driver-relevant service. In some examples, the driver profiles function can be turned oft such as if only one driver uses the vehicle 102.

In some examples, the driver may be enabled to select a driver profile from a list of available driver profiles stored for the vehicle 102. In other examples, the driver profiles may be cloud-based or may be stored on a device communicatively connected to the vehicle 102. In other examples, the driver's identity may be authenticated by an integrated or separate authentication mechanism, and when authenticated, the instrument cluster UI engine 104 may be configured to automatically access the associated driver's profile. In some examples, the identification of a driver may allow for additional personalization, such as being able to determine and inform the driver of relevant functionality which the driver did not use (e.g., that may improve vehicle performance) and provide tailored educational tips.

In some examples, a driver profile may be reset, which may return the driver profile to a factory default which may not contain a favorites view or a history of performance data. In some examples, there may be at least one driver profile that is actively available for manipulations, which may be referred to as the instrument cluster's current active state. For example, the current active state may be switched across between two and N driver profiles. The instrument cluster UI engine 104 may allow for only relevant driver profiles to be enabled. For example, if only two drivers share a vehicle 102, the drivers may be able to toggle between the active state between the two driver profiles.

Figure 13:
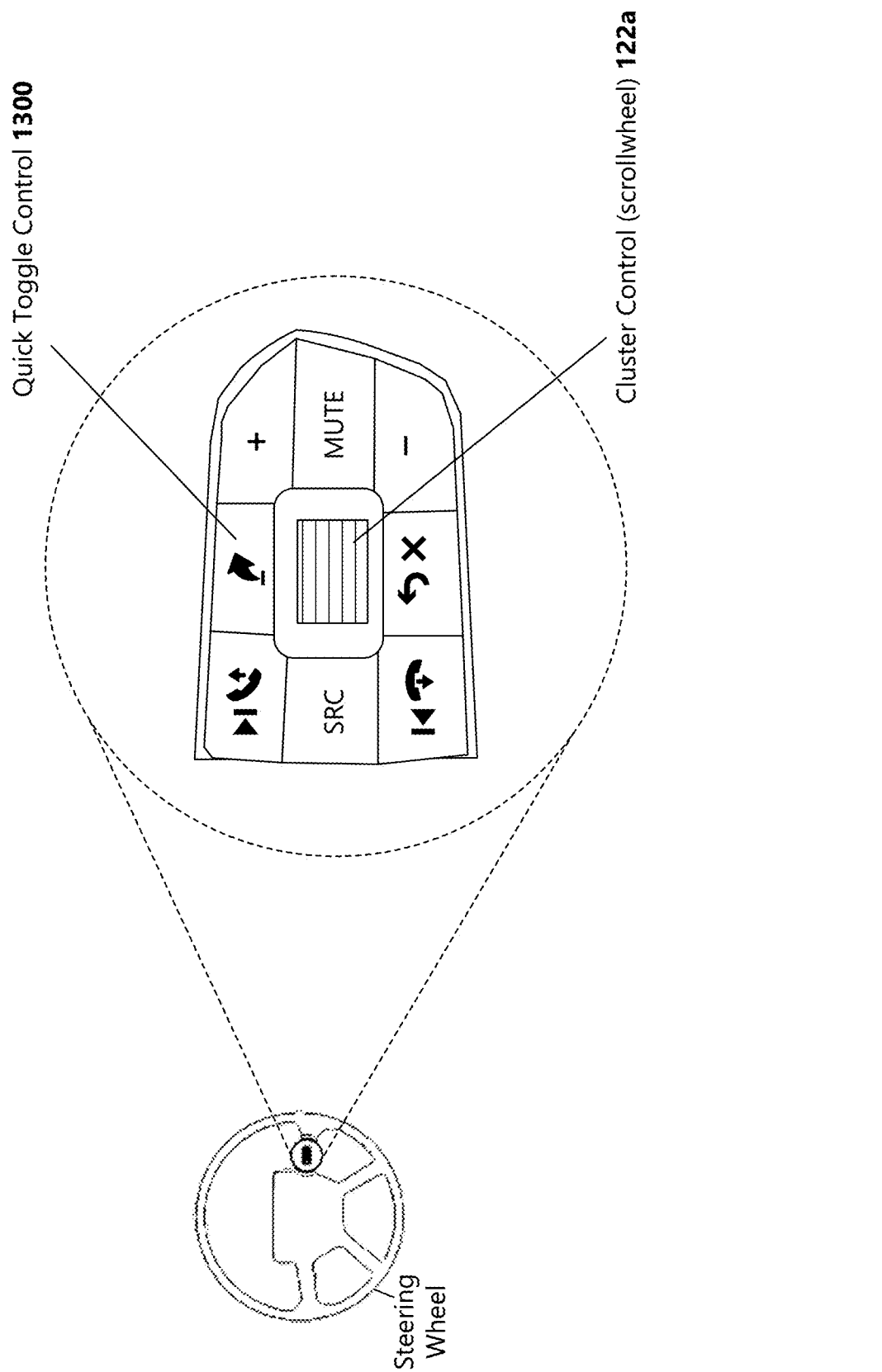
FIG. 13 is an illustration of an example quick toggle control.

In some examples and as illustrated in FIG. 13, a vehicle 102 may further include a steering wheel-based short cut button to toggle a changeable parameter. For example, a quick toggle control 1300 may be provided and located on the steering wheel in relation to the cluster control 122. According to an aspect, the instrument cluster 106 may have various switchable preference settings that a driver may wish to switch between while driving; however many preference settings may be located within menus that the driver may not be allowed to access or that may be difficult to access while driving, and thus may currently be switchable only while in a parked or neutral mode. Aspects of the present disclosure include providing the quick toggle control 1300 for enabling the driver to quickly toggle a designated setting.

Figure 14:
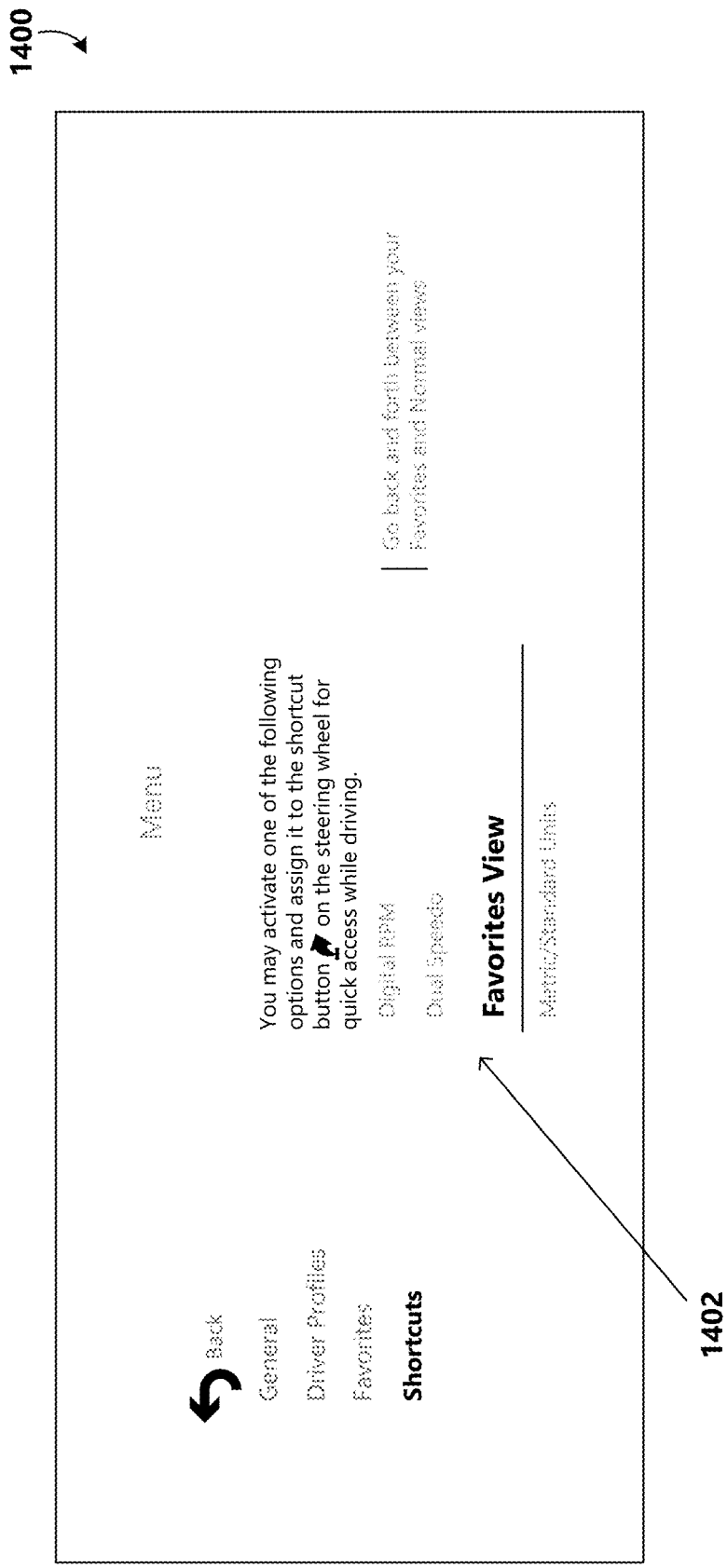
FIG. 14 is an illustration of an example menu user interface for assigning a shortcut to the quick toggle control.

An example menu screen 1400 is shown in FIG. 14 that a driver may use to assign a preference setting to the quick toggle control 1300. For example a shortcuts list 1402 may be provided that includes a listing of settings that the driver may select from for assigning as a shortcut. Non-limiting examples of settings that the driver may select from to assign to the quick toggle control 1300 include: changing between a view of home time and local time, a view of MPH or km/h on the digital speedometer, seeing the RPM digitally, turning on or off a dark cabin feature, changing the units of scales shown on the instrument cluster 106, changing between gauge content views 302-310, etc. Consider for example, a use case where a driver's route includes border crossings. The driver may select to assign a toggle between MPH and km/h to the quick toggle control 1300.

As can be appreciated, being able to assign a setting that the driver wants to be able to toggle between while driving may give the driver view control and adjustment they otherwise would not have had available. Additionally, a simple press of a steering wheel mounted button (i.e., the quick toggle control 1300) may provide a quick distraction-free switching to occur while driving. Because the short cut function is assignable, the quick toggle control 1300 may not take up a lot of switch space as would be required for dedicated buttons for each function that has a changeable aspect.

Figure 15:
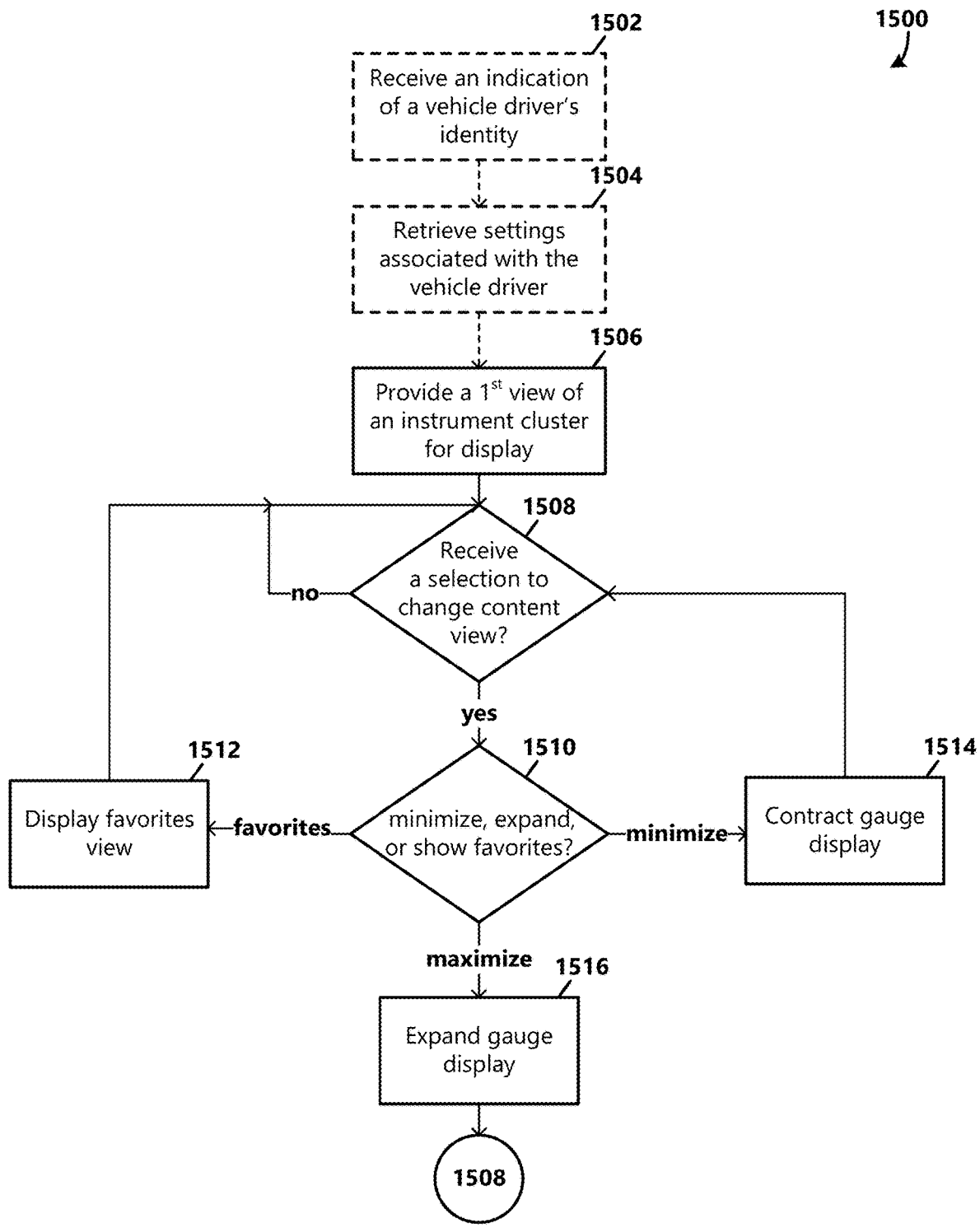
FIG. 15 is a flow diagram depicting general stages of an example process for providing a flexible and variability-accommodating instrument cluster for display on an in-vehicle screen.

FIG. 15 is a flow diagram depicting general stages of an example method 1500 for providing a flexible and variability-accommodating instrument cluster for display on an in-vehicle screen. At OPTIONAL OPERATION 1502, an indication of the driver's identity may be received. In some examples, the driver may select a driver profile from a list of driver profiles associated with the vehicle 102. In other examples, the driver's identity may be authenticated via various authentication methods, which may be linked to a driver profile stored locally on the vehicle 102 or remotely on a storage device in communication with the vehicle 102. At OPTIONAL OPERATION 1504, the driver profile may be retrieved.

At OPERATION 1506, a first view of the instrument cluster 106 may be displayed on an in-vehicle display screen 128. In some examples, the first view may be a last-displayed view for the driver (e.g., based on the driver profile). In other examples, the first view may be a default view, which may be one of: the minimized view 302,304, the basic content view 306, the enhanced view 308, or driver's favorites view 310.

At DECISION OPERATION 1508, a determination may be made as to whether a selection is received to change the content view. In some examples, the selection may be performed via a scrolling input of the cluster control 122. In other examples, the selection may be performed via a selection of the quick toggle control 1300 (e.g., if the quick toggle control 1300 is assigned to a content view toggle). In other examples, the selection may be made via a voice input or other user input method. If a determination is made that a selection to change the content view is not received, the method 1500 may continue to display the current content view and return to DECISION OPERATION 1508.

If a determination is made that a selection to change the content view is received, the method 1500 may proceed to OPERATION 1510, where a determination may be made as to whether the selection is a selection to minimize the displayed content, maximize the displayed content, or a selection of the favorites view 310. For example, the selection may be associated with a scrolling action of the cluster control 122, where a scroll in a first direction may be associated with a selection to expand the amount of displayed content (e.g., from a first minimized content view 302 to a second minimized content view 304, from a second minimized content view 304 to a basic content view 306, or from a basic content view 306 to an enhanced content view 308), and a scroll in the opposite direction may be associated with a selection to reduce the amount of displayed content (e.g., from a second minimized content view 304 to a first minimized content view 302, from a basic content view 306 to a second minimized content view 304, or from an enhanced content view 308 to a basic content view 306). When the favorites view 310 is selected, the instrument cluster 106 may be updated to the favorites view 310 at OPERATION 1512. When the favorites view 310 is selected, the instrument cluster 106 may be updated to the favorites view 310 at OPERATION 1512. When a selection to minimize the displayed content is received, the instrument cluster 106 may be updated to the first minimized content view 302, the second minimized content view 304, or the basic content view 306 (based on the currently displayed view) at OPERATION 1514. When a selection to maximize the displayed content is received, the instrument cluster 106 may be updated to the second minimized content view 304, the basic content view 306, or the enhanced content view 308 (based on the currently displayed view) at OPERATION 1516. The method 1500 may return to DECISION OPERATION 1508.

Figure 16:
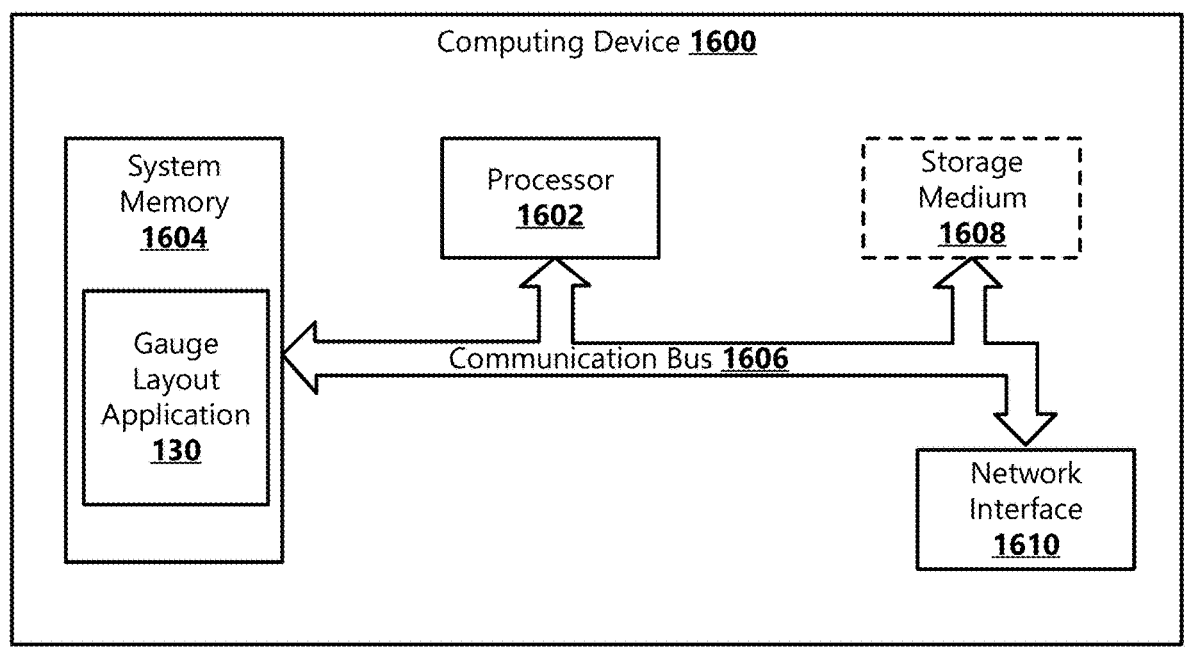
FIG. 16 is a block diagram of an example physical components of a computing device or system with which embodiments may be practiced.

FIG. 16 is a block diagram of an illustrative computing device 1600 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1600 includes at least one processor 1602 and a system memory 1604 connected by a communication bus 1606. Depending on the exact configuration and type of device, the system memory 1604 may be volatile or nonvolatile memory, such as read-only memory ("ROM"), random access memory ("RAM"), EEPROM, flash memory, or other memory technology. Those of ordinary skill in the art and others will recognize that system memory 1604 typically stores data or program modules that are immediately accessible to or currently being operated on by the processor 1602. In some examples, system memory 1604 may store an application to perform elements of the present systems and methods, such as the gauge layout application 130. In this regard, the processor 1602 may serve as a computational center of the computing device 1600 by supporting the execution of instructions.

As further illustrated in FIG. 16, the computing device 1600 may include a network interface 1610 comprising one or more components for communicating with other devices over a network. Embodiments of the present disclosure may access basic services that utilize the network interface 1610 to perform communications using common network protocols. The network interface 1610 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 16, the computing device 1600 also includes a storage medium 1608. However, services may be accessed using a computing device that does not include means for persisting data to a local storage medium. Therefore, the storage medium 1608 depicted in FIG. 16 is optional. In any event, the storage medium 1608 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 1604 and storage medium 1608 depicted in FIG. 16 are examples of computer-readable media.

For ease of illustration and because it is not important for an understanding of the claimed subject matter, FIG. 16 does not show some of the typical components of many computing devices. In this regard, the computing device 1600 may include input devices, such as a keyboard, keypad, mouse, trackball, microphone, video camera, touchpad, touchscreen, electronic pen, stylus, or the like. Such input devices may be coupled to the computing device 1600 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 1600 (e.g., a client device), or can be integral components of the computing device 1600. In some embodiments, multiple input devices may be combined into a single, multifunction input device (e.g., a video camera with an integrated microphone). The computing device 1600 may also include output devices such as a display, speakers, printer, etc. The output devices may include video output devices such as a display or touchscreen. The output devices also may include audio output devices such as external speakers or earphones. The output devices can be separate from and communicatively coupled to the computing device 1600, or can be integral components of the computing device 1600. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA', PHP, Perl, HTML, CSS, JavaScript, VBScript, ASPX, Microsoft.NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A method for providing a flexible and variability-accommodating instrument cluster for display on a screen in a vehicle, comprising:
    displaying the instrument cluster in a first content view of a set of content views, wherein the set of content views comprise:
        at least one user definable content view; and
        a plurality of predefined content views ranging from including a minimized set of content to a maximized set of content;
    assigning a user-selected changeable parameter associated with an instrument cluster content element to a steering wheel-based shortcut control, wherein assigning the changeable parameter comprises:
        presenting a plurality of changeable parameters that are available to be assigned to the shortcut control, wherein the plurality of changeable parameters comprises:
            one or more parameters associated with displaying the at least one user definable content view;
            one or more parameters associated with displaying one of the plurality of predefined content views; and
            one or more parameters associated with changing a setting associated with the instrument cluster; and
        receiving a first indication of a selection of a changeable parameter from among the plurality of changeable parameters;
    receiving a second indication of an actuation of the shortcut control while the vehicle is in a driving mode; and
    in response to receiving the second indication, updating the displayed instrument cluster by toggling the user-selected changeable parameter.

2. The method of claim 1, wherein when the first content view or a second content view defined by the user-selectable changeable parameter is a content view including the maximized set of content, prior to displaying the maximized set of content in the instrument cluster, determining which content, from a set of available content, to include in the maximized set of content.

3. The method of claim 2, wherein determining which content to include in the maximized set of content comprises basing a determination on a priority level and a set of layout rules.

4. The method of claim 3, wherein displaying the instrument cluster in the first content view and displaying the instrument cluster in the second content view comprises displaying the set of content according to a default layout of content containers associated with the set of layout rules.

5. The method of claim 1, wherein displaying the instrument cluster in the first content view or expanding or contracting the set of content included in the displayed instrument cluster based on the a second content view defined by the user-selectable changeable parameter comprises displaying the instrument cluster in a favorites view.

6. The method of claim 5, wherein displaying the instrument cluster in the favorites view comprises displaying one of the plurality of predefined content views in a pre-selected layout, wherein the favorites view is specific to a driver of the vehicle or specific to a task associated with usage of the vehicle.

7. The method of claim 6, wherein displaying the user-selected set of content specific to the driver of the vehicle comprises
- determining a current driver of the vehicle from a set of drivers;
- retrieving stored user-configured settings associated with the current driver, the settings including the one of the plurality of predefined content views specific to the driver; and
- including, in the favorites view, the one of the plurality of predefined content views specific to the current driver of the vehicle.

8. The method of claim 7, further comprising, for each driver of the set of drivers;
- prior to displaying the instrument cluster in the favorites view, while in a parked mode, presenting, on the screen, a user interface including a plurality of containers and a set of available content from which the driver can select to include in one or more of the containers;
- receiving a selection of a set of content specific to the driver of the vehicle; and
- storing the selected set of content specific to the driver of the vehicle as user-configured settings specific to the driver.

9. The method of claim 1, wherein each of the plurality of changeable parameters correspond with an active and available sensor of the vehicle.

10. The method of claim 9, further comprising:
- automatically detecting a status of each sensor of the vehicle; and
- automatically updating the plurality of changeable parameters based on the status.

11. A system for providing a flexible and variability-accommodating instrument cluster for display on a screen in a vehicle; the system comprising:
- at least one processor;
- a memory storage device including instructions that when executed by the at least one processor are configured to:
  - display the instrument cluster in a first content view of a set of content views, wherein the set of content views comprise:
    - at least one user definable content view; and
    - a plurality of predefined content views ranging from including a minimized set of content to a maximized set of content;
  - assign a user-selected changeable parameter associated with an instrument cluster content element to a steering wheel-based shortcut control, wherein assigning the changeable parameter comprises:
    - presenting a plurality of changeable parameters that are available to be assigned to the shortcut control, wherein the plurality of changeable parameters comprises:
      - one or more parameters associated with displaying the at least one user definable content view;
      - one or more parameters associated with displaying one of the plurality of predefined content views; and
      - one or more parameters associated with changing a setting associated with the instrument cluster; and
    - receiving a first indication of a selection of a changeable parameter from among the plurality of changeable parameters;
  - receive a second indication of an actuation of the shortcut control while the vehicle is in a driving mode; and
  - in response to receiving the second indication, update the displayed instrument cluster by toggling the user-selected changeable parameter.

12. The system of claim 11, wherein when the first content view or a second content view defined by the user-selectable changeable parameter is a content view including the maximized set of content, the system is further configured to:
- determine which content, from a set of available content, to include in the maximized set of content; and
- transform the instrument cluster to display the content determined for inclusion in the maximized set of content.

13. The system of claim 12, wherein the content determined for inclusion in the maximized set of content is determined based on a priority level and a set of layout rules.

14. The system of claim 13, wherein in displaying the instrument cluster in the first content view and displaying the instrument cluster in the next content view, the system is configured to:
- display the set of content according to a default layout of content containers associated with the set of layout rules.

15. The system of claim 11, wherein the set of content views further comprises a favorites view including one of the plurality of predefined content views included in a pre-selected layout of content containers associated with a set of layout rules.

16. The system of claim 15, wherein the favorites view is specific to a task associated with usage of the vehicle.

17. The system of claim 15, wherein the favorites view is specific to a driver of the vehicle, and the system is further configured to:
- determine a current driver of the vehicle from a set of drivers;
- retrieve stored user-configured settings associated with the current driver, the settings including the one of the plurality of predefined content views specific to the current driver; and
- include, in the favorites view, one of the plurality of predefined content views specific to the current driver of the vehicle.

18. The system of claim 17, wherein for each driver of the set of drivers, the system is further configured to:
- while in a parked mode, present on the screen, a user interface including a plurality of containers and a set of available content from which the driver can select to include in one or more of the containers;

receive a selection of a set of content and a selection of a layout of the set of content; and store the selected set of content and layout as the favorites view for the driver.

19. A non-transitory computer readable storage device including computer readable instructions, which when executed by a processing unit are configured to provide one or a combination of:

displaying a flexible and variability-accommodating instrument cluster on a screen in a vehicle in a first content view of a set of content views, wherein the set of content views comprise:

at least one user definable content view, a plurality of predefined content views ranging from including a minimized set of content to a maximized set of content arranged according to a default layout of content containers associated with a set of layout rules, and a favorites view comprising a pre-selected set of content in a pre-selected layout specific to a driver of the vehicle or specific to a task associated with usage of the vehicle;

assigning a user-selected changeable parameter associated with an instrument cluster content element to a steering wheel-based shortcut control, wherein assigning the changeable parameter comprises:

presenting a plurality of changeable parameters that are available to be assigned to the shortcut control, wherein the plurality of changeable parameters comprises:

one or more parameters associated with displaying the at least one user definable content view;

one or more parameters associated with displaying one of the plurality of predefined content views; and one or more parameters associated with changing a setting associated with the instrument cluster;

receiving a first indication of a selection of a changeable parameter from among the plurality of changeable parameters;

receiving a second indication of an actuation of the shortcut control while the vehicle is in a driving mode; and in response to receiving the second indication, updating the displayed instrument cluster by toggling the user-selected changeable parameter, wherein the user-selected changeable parameter defines a second content view, and wherein updating the displayed instrument cluster to the second content view comprises:

when the second view is the content view including the maximized set of content, determining which content, from a set of available content, to include in the maximized set of content based on a priority level and the set of layout rules;

expanding or contracting a level of detail in the set of content included in the displayed instrument cluster based on the selected next content view; or if the favorites view is selected, displaying the pre-selected set of content in the pre-selected layout.

* * * * *